(12) United States Patent
Lee et al.

(10) Patent No.: US 11,788,880 B2
(45) Date of Patent: Oct. 17, 2023

(54) DEVICE AND METHOD FOR DETECTING STATES OF A LINEAR GUIDEWAY

(71) Applicant: HIWIN TECHNOLOGIES CORP., Taichung (TW)

(72) Inventors: Po-Lin Lee, Taichung (TW); Hsien-Yu Chen, Taichung (TW); Stephanie Chun-Ming Yang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 17/305,756

(22) Filed: Jul. 14, 2021

(65) Prior Publication Data

US 2022/0178739 A1 Jun. 9, 2022

(30) Foreign Application Priority Data

Dec. 9, 2020 (TW) ................................. 109143350

(51) Int. Cl.
| | | |
|---|---|---|
| *G01H 7/00* | (2006.01) | |
| *F16C 29/00* | (2006.01) | |
| *G01M 13/028* | (2019.01) | |
| *G01M 13/045* | (2019.01) | |
| *G01H 1/08* | (2006.01) | |
| *F16C 41/00* | (2006.01) | |

(52) U.S. Cl.
CPC ............. *G01H 7/00* (2013.01); *F16C 29/005* (2013.01); *F16C 41/00* (2013.01); *F16C 2233/00* (2013.01); *G01H 1/08* (2013.01); *G01M 13/028* (2013.01); *G01M 13/045* (2013.01)

(58) Field of Classification Search
CPC ..... G01H 7/00; F16C 29/005; F16C 2233/00; G01M 13/045; G01M 13/028

USPC ............................................................ 73/586
See application file for complete search history.

(56) References Cited

U.S. PATENT DOCUMENTS

| | | | |
|---|---|---|---|
| 2002/0129508 A1* | 9/2002 | Blattner ................ | F16C 41/007 33/706 |
| 2019/0361758 A1* | 11/2019 | Yamanaka .......... | G06F 11/0706 |
| 2021/0372477 A1* | 12/2021 | Namiki .................... | F16C 19/52 |

FOREIGN PATENT DOCUMENTS

| | | | | |
|---|---|---|---|---|
| EP | 3546778 A1 | * | 10/2019 | ............ F16C 19/527 |
| JP | 2002107348 A | * | 4/2002 | |
| JP | 2008303953 A | * | 12/2008 | .............. F16C 29/00 |
| JP | 2018138817 A | | 9/2018 | |
| JP | 2018138817 B2 | | 9/2018 | |
| JP | 2019127951 A | * | 8/2019 | |
| JP | 2020106035 A | | 7/2020 | |

(Continued)

OTHER PUBLICATIONS

Translation JP-2021070462-A (Year: 2021).*
Translation JP-2008303953_A (Year: 2008).*

*Primary Examiner* — Mischita L Henson
*Assistant Examiner* — Monica S Young
(74) *Attorney, Agent, or Firm* — Wang Law Firm, Inc.

(57) ABSTRACT

A device and a method for detecting states of a linear guideway including a sliding block and a slide rail are provided. The device includes a sensor located at a position corresponding to a side surface of the slide rail, and an analysis processer communicated with the sensor. The sensor detects the vibrating of the slide rail to generate a sensing signal. The analysis processer compares the sensing signal with at least one threshold, to determines occurrence of abnormalities. Therefore, the sensitivity for detection may be increased.

3 Claims, 21 Drawing Sheets

(56) References Cited

FOREIGN PATENT DOCUMENTS

| JP | 2021070462 A | * | 5/2021 |
| TW | 201843549 A | | 12/2018 |
| TW | 202042961 A | | 12/2020 |

* cited by examiner

DEVICE AND METHOD FOR DETECTING STATES OF A LINEAR GUIDEWAY

BACKGROUND

Field of the Invention

The present invention relates to a detection device, and more particularly to a device and a method for detecting states of a linear guideway.

Related Prior Art

The existing mechanism applied to detect the states of a linear guideway, such as Japanese patent No. 2018138817A, includes a sensor on the upper surface of an end of the slide rail, and then determines whether an abnormality occurs, through the signal of the sensor. However, this previous case simply uses time-domain signals to determine whether an abnormality occurs, so that the abnormality determination mechanism (such as a threshold) in this case is easily affected by the surrounding environment, leading to lower sensing accuracy.

Therefore, the conventional devices and methods for detecting states of a linear guideway still have their shortcomings and need to be improved.

SUMMARY

Accordingly, one objective of the present invention is to provide a device and a method for detecting states of a linear guideway, which is able to overcome the problem that abnormality determination in the prior art is susceptible to environmental influences, and improve the sensitivity of detection.

A device for detecting states of a linear guideway in accordance with an embodiment of the invention is provided, the linear guideway includes a sliding block and a slide rail, the sliding block includes an accommodating groove for accommodating the slide rail, the sliding block further includes two opposite side surfaces in the accommodating groove, the slide rail includes two opposite side surfaces, and the two side surfaces of the sliding block respectively correspond to the two side surfaces of the slide rail. The device comprises: at least one sensor located at a position (namely, facing the side surface of the slide rail, and being attached to or located a distance away from the side surface of the slide rail) corresponding to the side surface of the slide rail, and used to detect vibration of the slide rail to generate a sensing signal; and an analysis processor communicatively connected to the at least one sensor to determine occurrence of an abnormality according to a level of the sensing signal and at least one threshold.

A method for detecting states of a linear guideway is provided in accordance with an embodiment of the invention, the linear guideway includes a sliding block and a slide rail, the sliding block includes an accommodating groove for accommodating the slide rail, the sliding block further includes two opposite side surfaces in the accommodating groove, the slide rail includes two opposite side surfaces, and the two side surfaces of the sliding block respectively correspond to the two side surfaces of the slide rail. The method comprises the following steps: (A) detecting, by at least one sensor located at one end of the slide rail and located on or adjacent to the side surface(s) of the slide rail, vibration of the slide rail to generate a sensing signal; and (B) determining, by an analysis processor, occurrence of an abnormality according to a level of the sensing signal and at least one threshold.

In this way, the device and method for detecting states of a linear guideway provided by the present invention uses the method of comparing the first sensing signal and the second sensing signal to determine whether an abnormality occurs, so that the degree of interference from the environment is relatively low, leading to much higher sensitivity of detection.

BRIEF DESCRIPTION OF THE DRAWINGS

After studying the detailed description in conjunction with the following drawings, other aspects and advantages of the present invention will be discovered.

DETAILED DESCRIPTION

Figure 1:
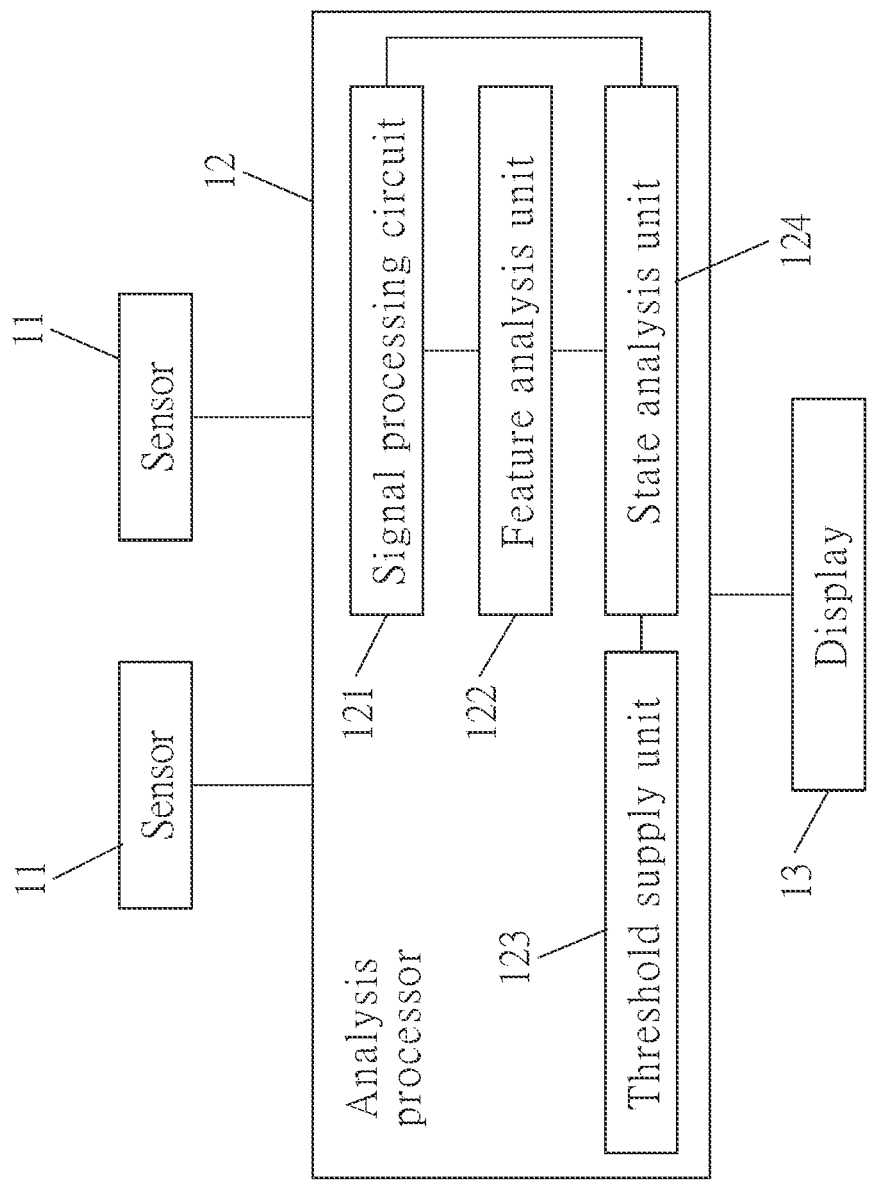
FIG. 1 is a functional block diagram of a device for detecting states of a linear guideway according to an embodiment of the present invention.

Please refer to FIGS. 1-4, illustrating a device suitable for detecting states of a linear guideway 20 according to an embodiment of the present invention. The linear guideway 20 includes a sliding block 21 and a slide rail 22. The sliding block 21 includes an accommodating groove S1, and the accommodating groove S1 is used to accommodate the slide rail 22. The sliding block 21 further includes two opposite side surfaces 211 and a bottom surface 212 connected to the two side surfaces 211 in the accommodating groove S1. The slide rail 22 includes two opposite side surfaces 221 and an upper surface 222 connected to the two side surfaces 221. The two side surfaces 211 of the sliding block 21 respectively correspond to the two side surfaces 221 of the slide rail 22, and the bottom surface 212 of the sliding block 21 corresponds to the upper surface 222 of the slide rail 22. At least one rolling path is provided between each of the two side surfaces 211 of the sliding block 21 and each of the two opposite sides (i.e., the two side surfaces 221) of the slide rail 22. The rolling path is used for accommodating rolling elements, and the rolling elements in the rolling path contact and abut against the sliding block 21 and the slide rail 22.

This device includes two sensors 11, an analysis processor 12 and a display 13. The analysis processor 12 can be communicatively connected to the two sensors 11 and the display 13 (as required). In this embodiment, the two sensors 11 are, for example, wiredly connected to the analysis processor 12, and however, the present invention is not limited to this embodiment; and in other embodiments of the present invention, the two sensors 11 can also be wirelessly connected to the analysis processor 12.

Figure 17:
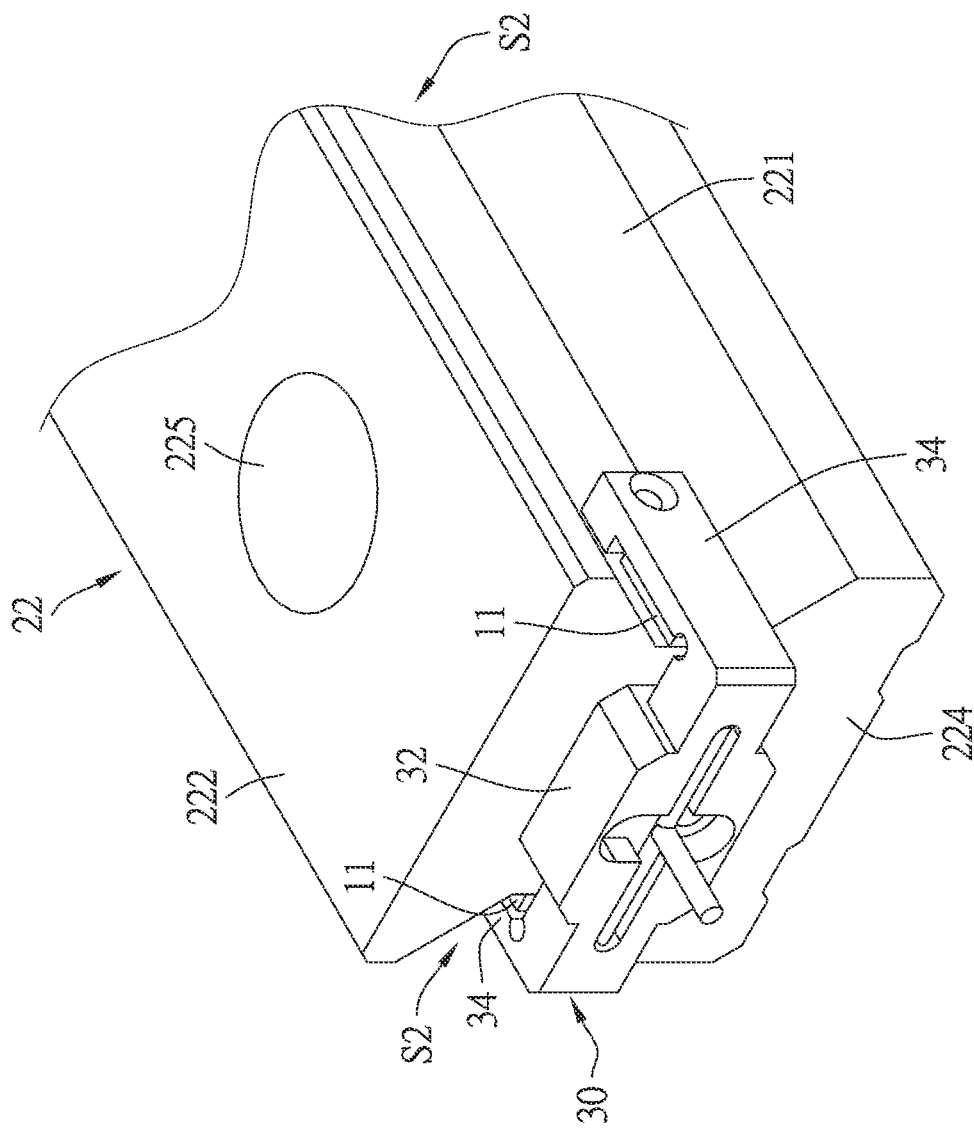
FIG. 17 is a schematic diagram of positioning two sensors on a linear guideway using a clamp according to an embodiment of the present invention.

Each of the sensors 11 is a sensor capable of sensing vibration of the slide rail 22, such as a speed sensor, an acceleration sensor, a microphone, etc. Moreover, the configuration of the sensors 11 can be designed according to the operating principle of the sensors 11 selected. In this embodiment, the two sensors 11 are, for example, acceleration sensors or the like to detect vibration on the slide rail 22 by touching the slide rail 22, so the two sensors 11 are configured to be attached to one end 223 of the slide rail 22 and close to an end surface 224 of the slide rail 22, especially attached to the two side surfaces 221 at the end 223 respectively. Of course, in other embodiments, the sensors 11 may not be close to the end surface 224, and for example, they are arranged at the middle section of the side surfaces 221 or any positions in the side surfaces 221 along the axial direction of the slide rail 22; and, the disposition positions of the sensors 11 depend on requirements. The sensors 11 are attached to the end 223 of the slide rail 22 in a manner such as fastening, adhesion, magnetic attraction, or clamping by a clamp. In a case where the two sensors 11 are clamped by a clamp, as shown in the embodiment in FIG. 17, the two sensors 11 are respectively positioned on the two side surfaces 221 by a clamp 30, the clamp 30 includes a connecting portion 32 and two clamping portions 34 respectively connected to two ends of the connecting portion 32, the connecting portion 32 faces the end surface 224, the two clamping portions 34 respectively face the two side surfaces 221 and extend along the axial direction of the slide rail 22, and each sensor 11 is clamped between the corresponding clamping portion 34 and the corresponding side surface 221 by the elastic force of the clamping portion 34 so as to achieve the purpose of positioning the sensors 11. In this embodiment, each sensor 11 and the clamp 30 can be two independent mechanisms, but in other embodiments, the sensors 11 can be integrated with the clamping portions 34 respectively. Alternatively, in some embodiments (not shown), the clamp may include a body and two clamping portions respectively connected to the two ends of the body and extending downward, the body is located on the upper surface 222 of the slide rail 22, and a fixing member (such as a screw) locks the body to a lock hole 225 of the upper surface 222, and the clamping portions are located at the side surfaces 221 to clamp and position the sensors 11 to the side surfaces 221. However, the present invention is not limited to the above-mentioned contact-type embodiments. In another embodiment, the sensor can also be a microphone to detect vibration in a non-contact manner, and therefore, the sensors can face the side surfaces 221 and be separated from the side surfaces 221 by a distance, as long as the sensors are disposed at a position corresponding to the side surfaces 221.

Figure 3:
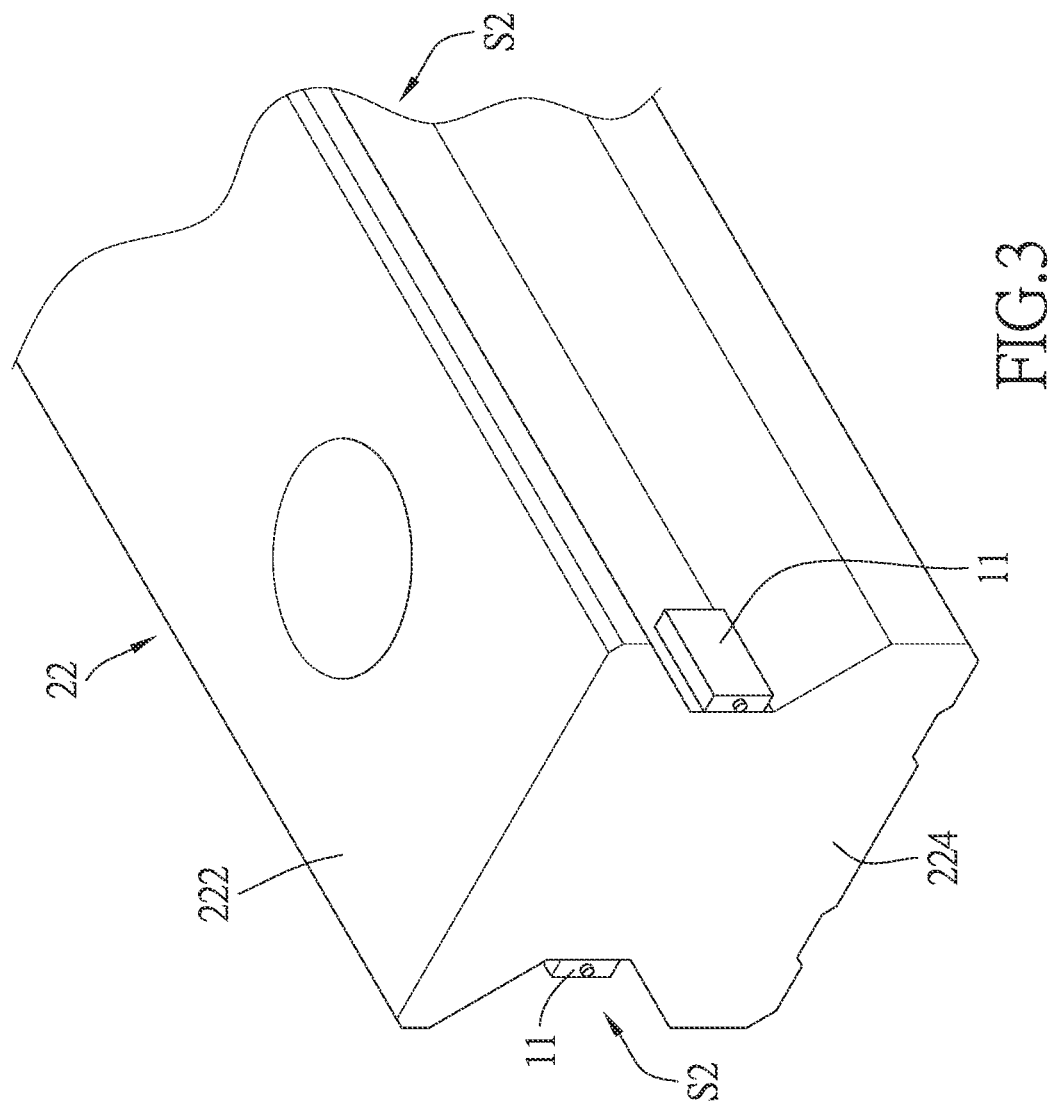
FIG. 3 is an exploded view of FIG. 2.
Figure 4:
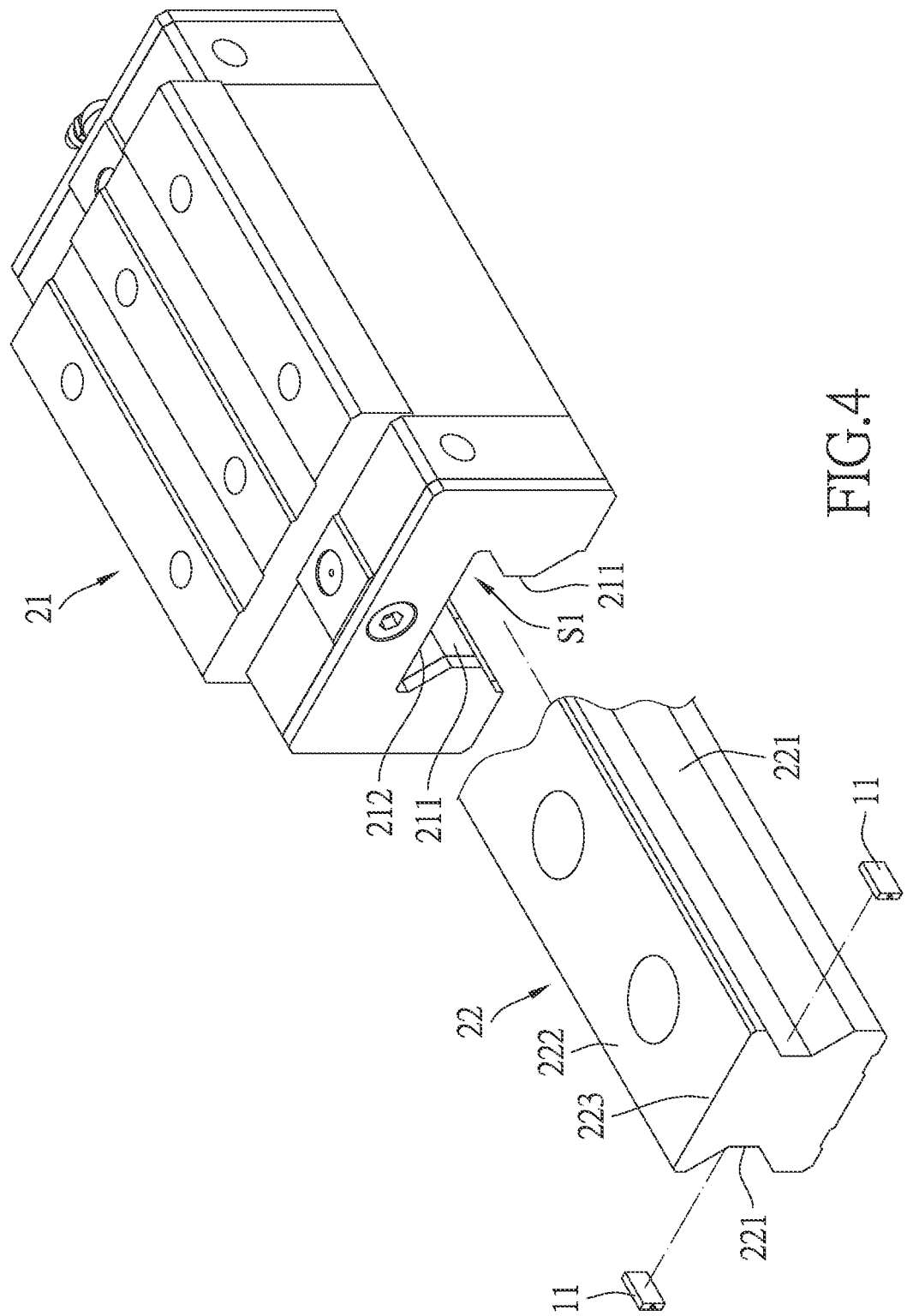
FIG. 4 is a magnified view of a part of FIG. 2 to show that two sensors are arranged on opposite sides of the end of the slide rail.
Figure 18:
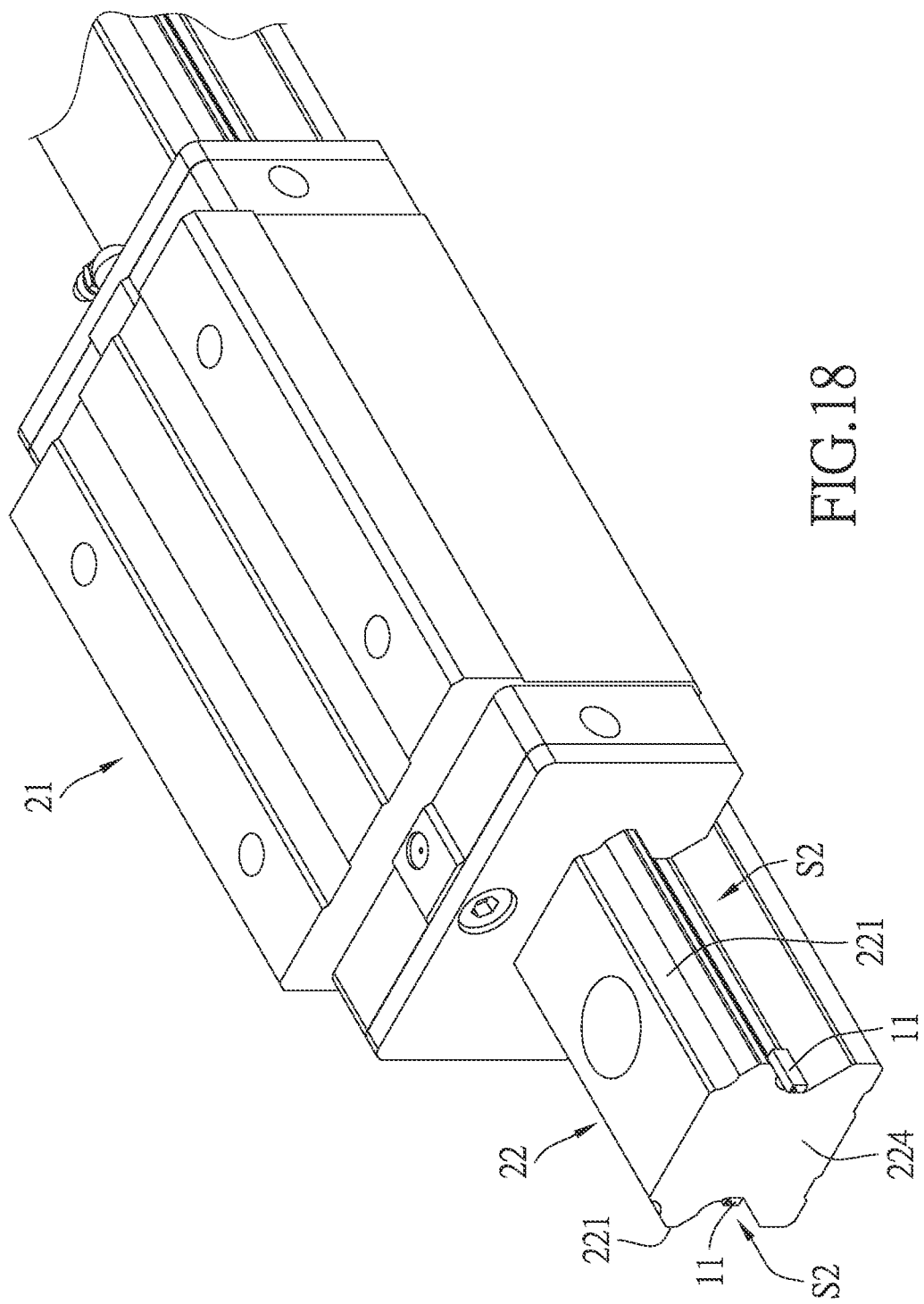
FIG. 18 is a schematic diagram of installing two sensors on a linear guideway according to an embodiment of the present invention.
Figure 19:
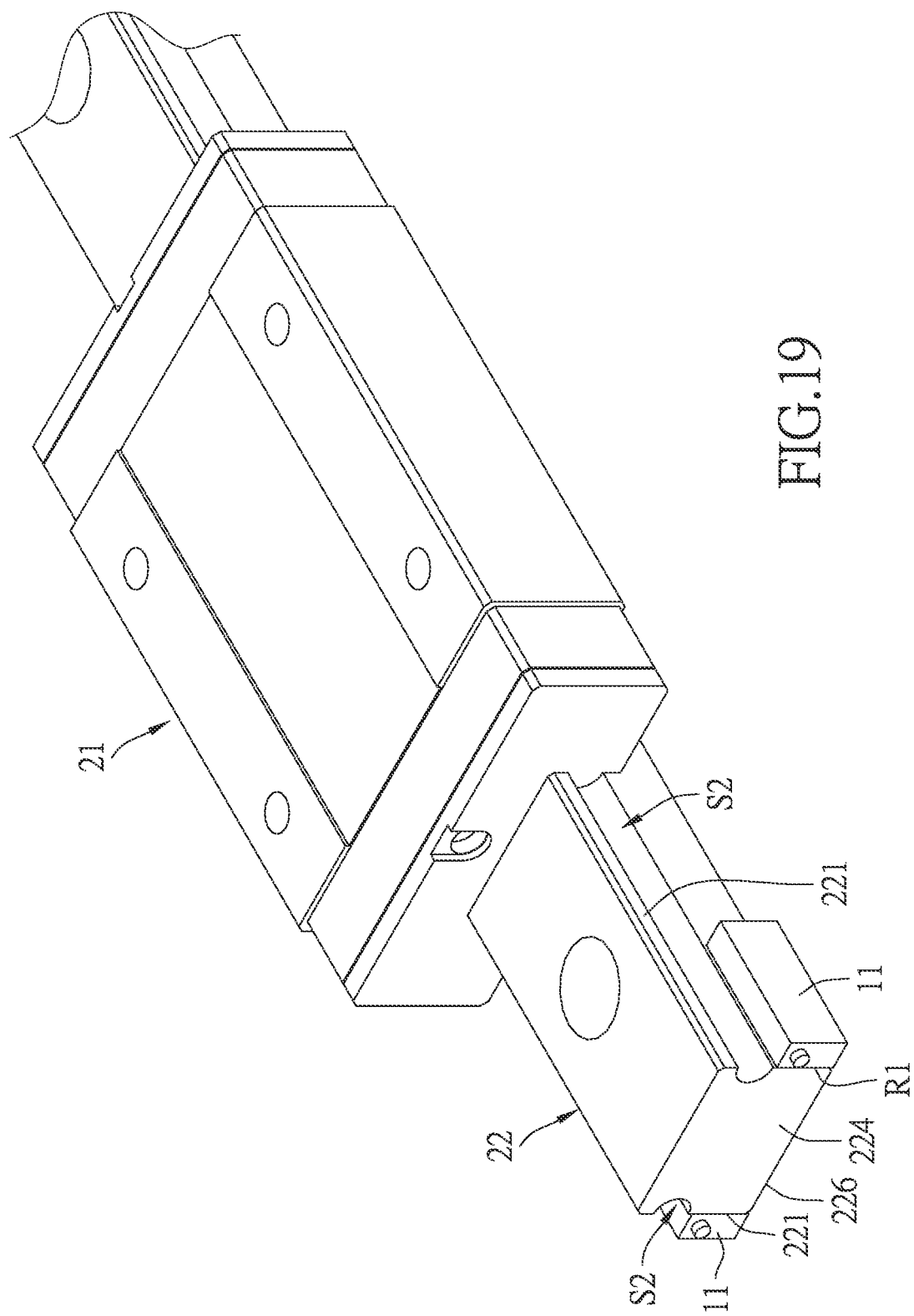
FIG. 19 is a schematic diagram of installing two sensors on a linear guideway according to an embodiment of the present invention.
Figure 20:
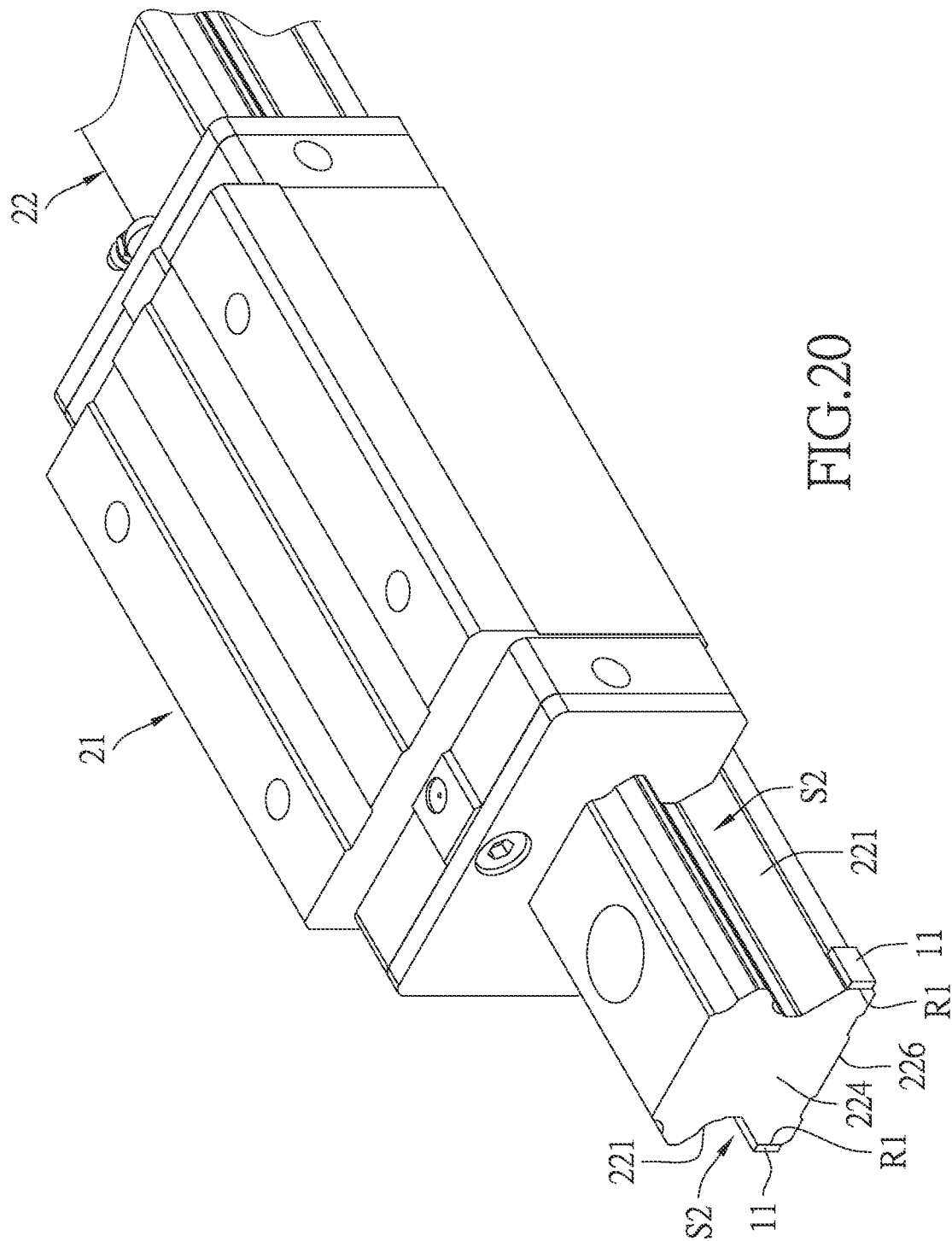
FIG. 20 is a schematic diagram of installing two sensors on a linear guideway according to an embodiment of the present invention.

In this embodiment, the two side surfaces 221 of the slide rail 22 are each recessed to form an accommodating groove S2, and the two sensors 11 are respectively disposed at the bottom of the accommodating grooves S2 of the two side surfaces 221, as shown in FIG. 3. In this embodiment or other embodiments, as shown in FIGS. 3 and 18, the specification and size of the sensors 11 can be selected to reduce the extent that the sensors 11 occupy the stroke length of the slide rail 22. However, the present invention is not limited to the disposition position described above. In another embodiment, as shown in FIGS. 19 and 20, the two sensors 11 can be respectively arranged on regions R1 that are any regions in the two side surfaces 221 except the accommodating grooves S2, and this region R1 is not only close to the end surface 224, but also close to a surface 226 of the slide rail 22 that does not touch the sliding block 21 and is far away from the sliding block 21; and since the sensors 11 are disposed at positions that do not interfere with the movement of the sliding block 21, the maximum slidable distance of the sliding block 21 on the slide rail 22 is substantially equal to the length of the slide rail 22.

Through the above-mentioned two sensors 11 arranged at opposite sides of the slide rail 22, the device of the present invention can detect the vibration of the slide rail 22 to know whether the operation of the linear guideway 20 is abnormal.

Figure 5:
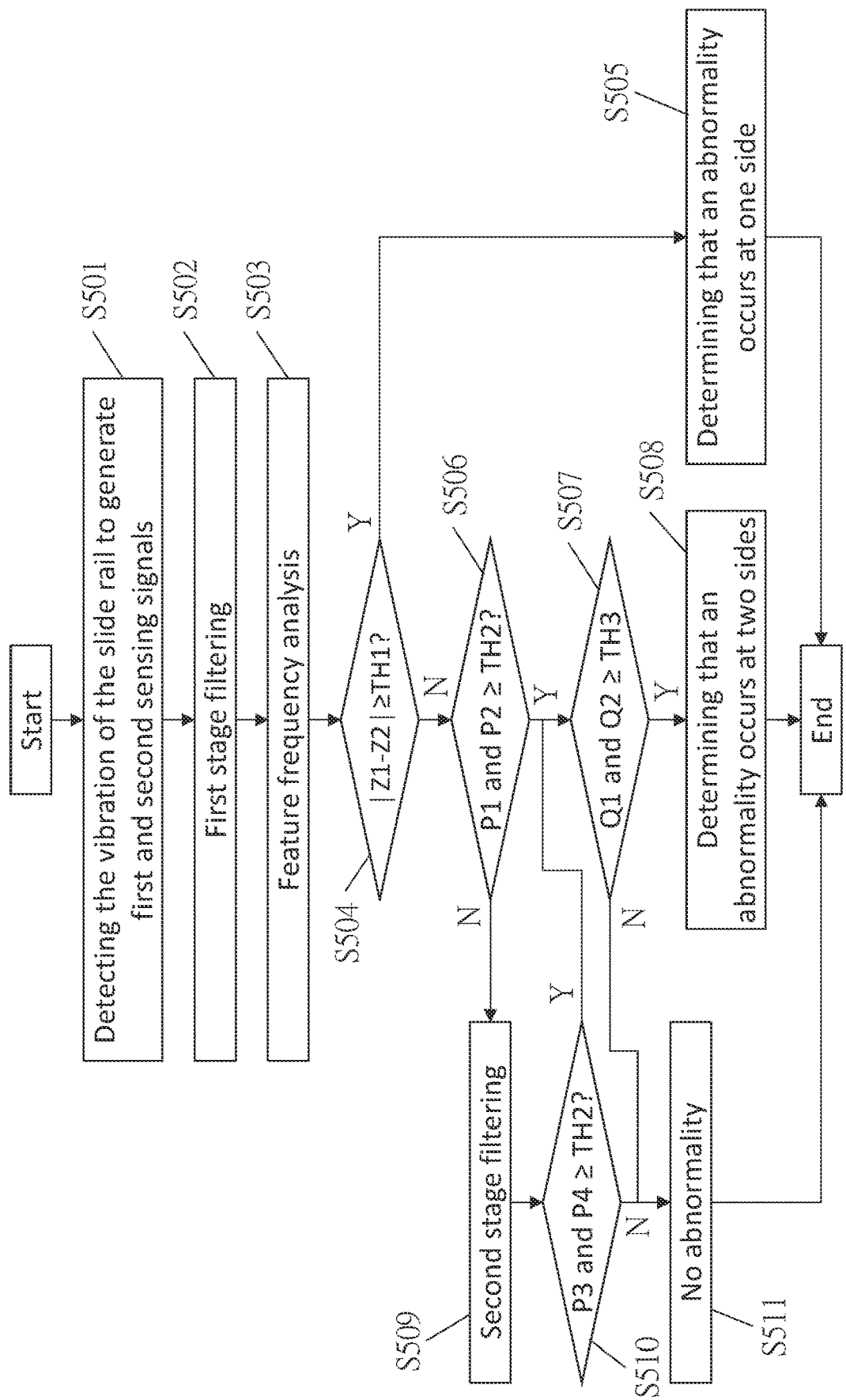
FIG. 5 is a flowchart of a method for detecting states of a linear guideway according to an embodiment of the present invention.
Figure 6:
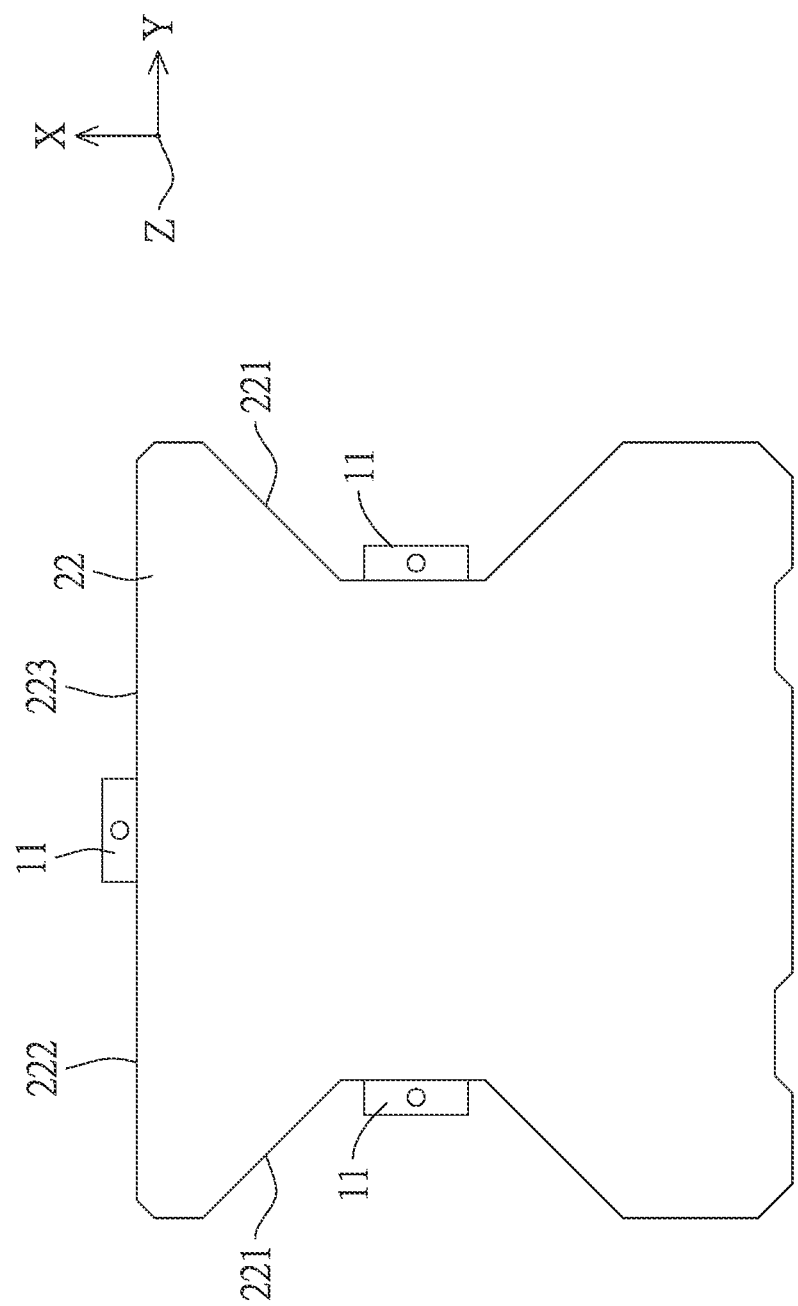
FIG. 6 is a schematic diagram of a verification device to present the disposition positions of three sensors.
Figure 7B:
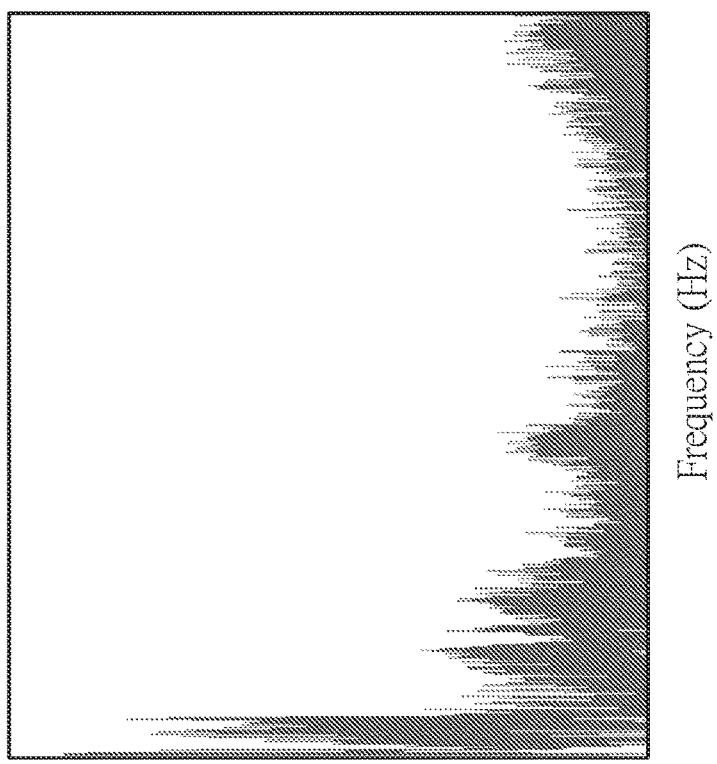
FIG. 7B is a signal diagram in the verification procedure to show the detection result of detecting the vibration of the slide rail in an abnormal state along the Z axis by the left sensor.
Figure 7A:
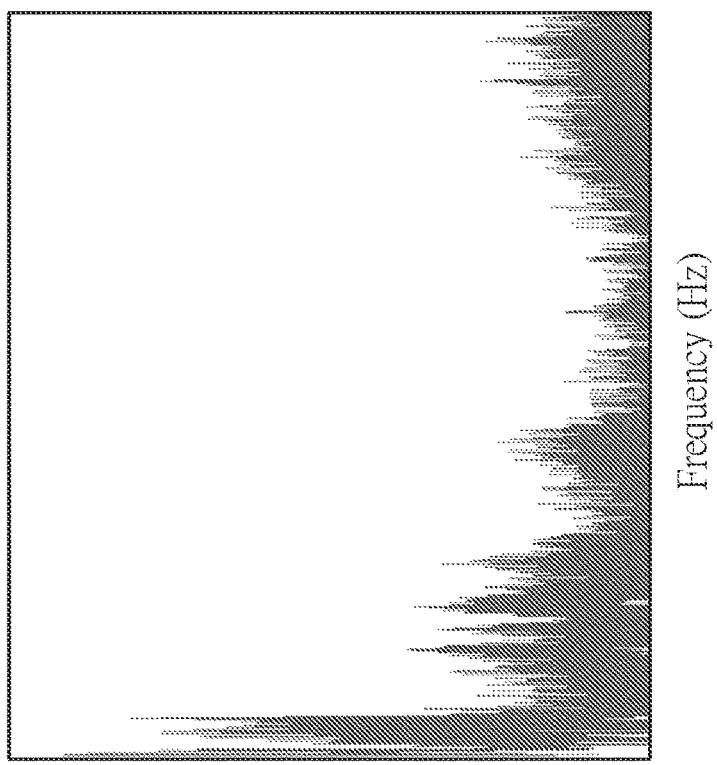
FIG. 7A is a signal diagram in the verification procedure to show the detection result of detecting the vibration of the slide rail in the initial state along the Z axis by the left sensor.
Figure 8B:
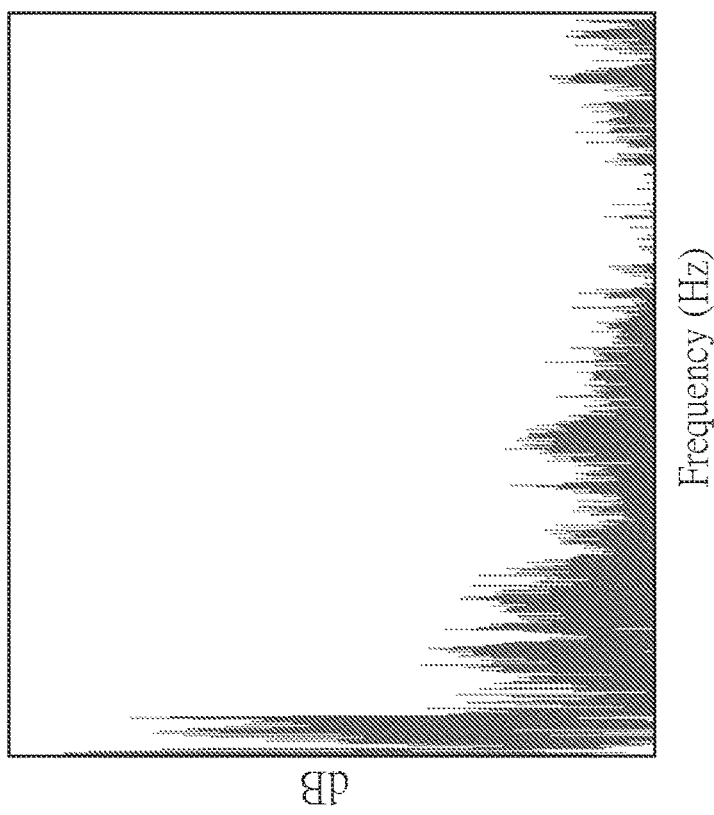
FIG. 8B is a signal diagram in the verification procedure to show the detection result of detecting the vibration of the slide rail in an abnormal state along the Z axis by the upper sensor.
Figure 8A:
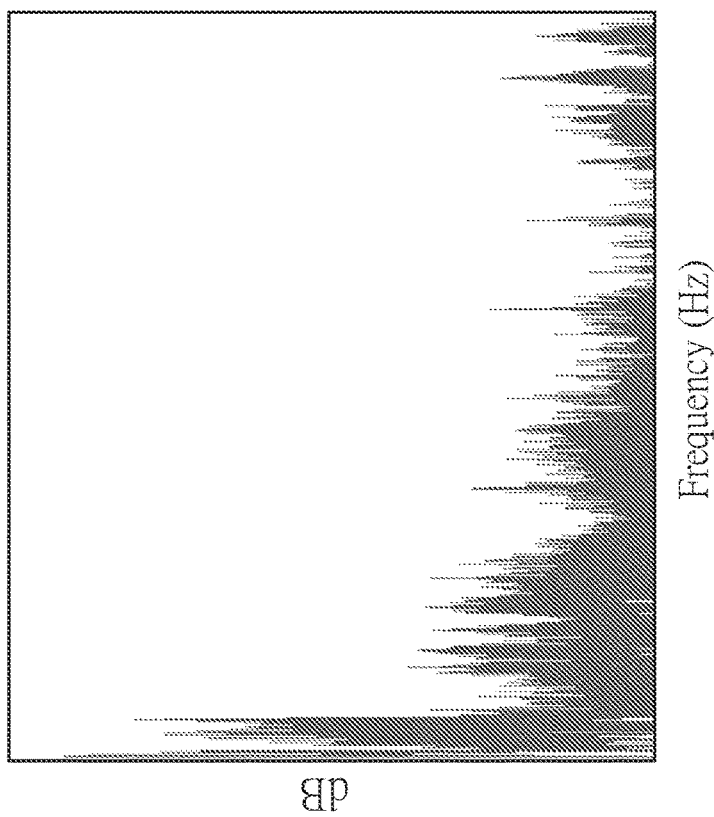
FIG. 8A is a signal diagram in the verification procedure to show the detection result of detecting the vibration of the slide rail in the initial state along the Z axis by the upper sensor.
Figure 9A:
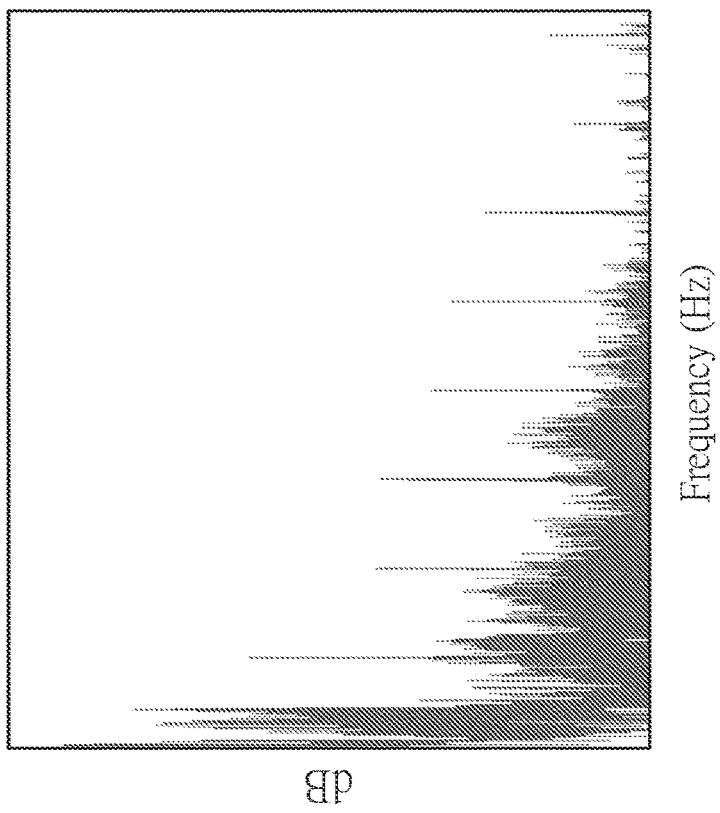
FIG. 9A is a signal diagram in the verification procedure to show the detection result of detecting the vibration of the slide rail in the initial state along the Z axis by the right sensor.
Figure 9B:
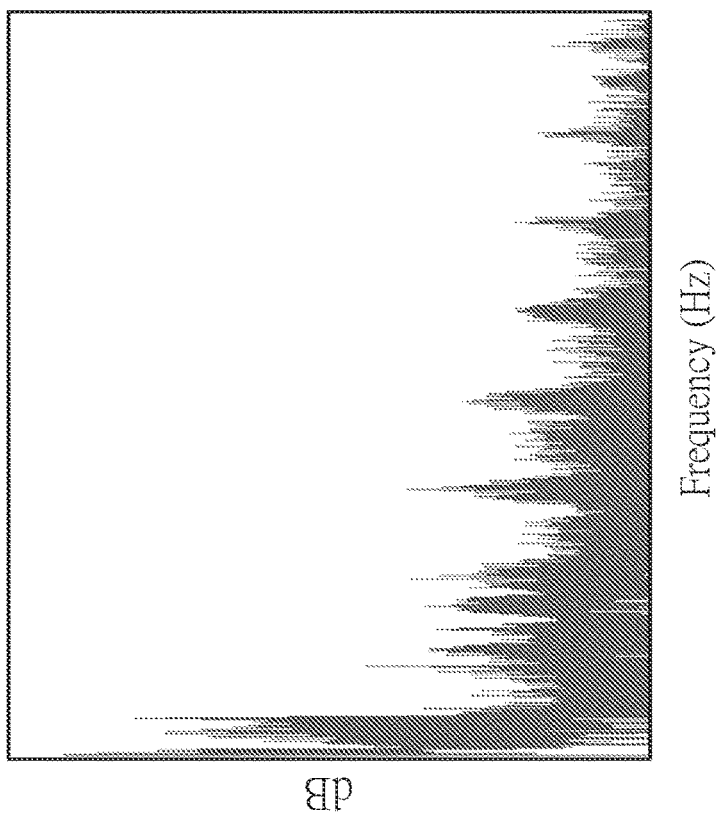
FIG. 9B is a signal diagram in the verification procedure to show the detection result of detecting the vibration of the slide rail in the abnormal state along the Z axis by the right sensor.
Figure 10B:
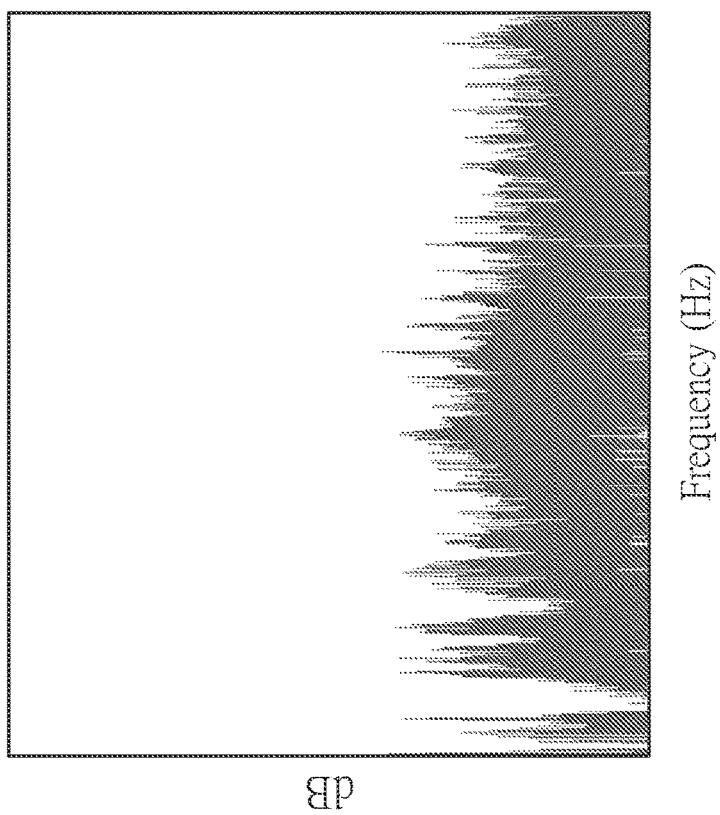
FIG. 10B is a signal diagram in the verification procedure to show the detection result of detecting the vibration of the slide rail in an abnormal state along the X axis by the left sensor.
Figure 10A:
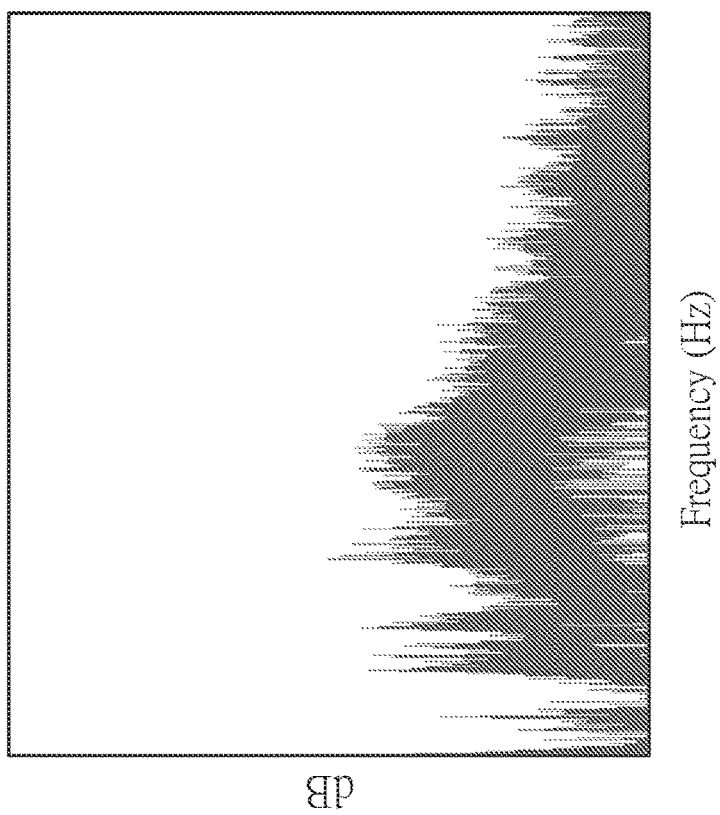
FIG. 10A is a signal diagram in the verification procedure to show the detection result of detecting the vibration of the slide rail in the initial state along the X axis by the left sensor.
Figure 11B:
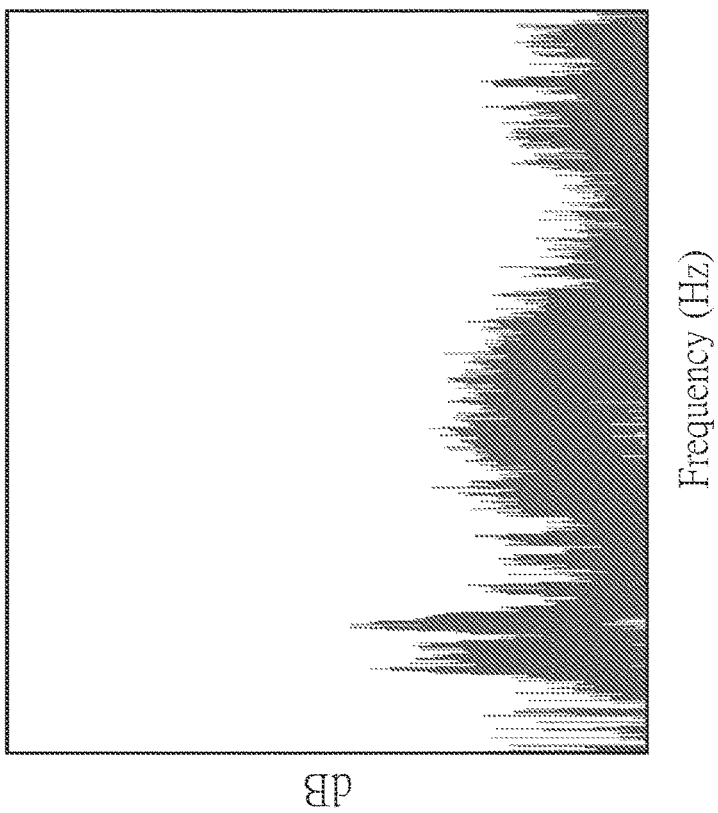
FIG. 11B is a signal diagram in the verification procedure to show the detection result of detecting the vibration of the slide rail in an abnormal state along the X axis by the upper sensor.
Figure 11A:
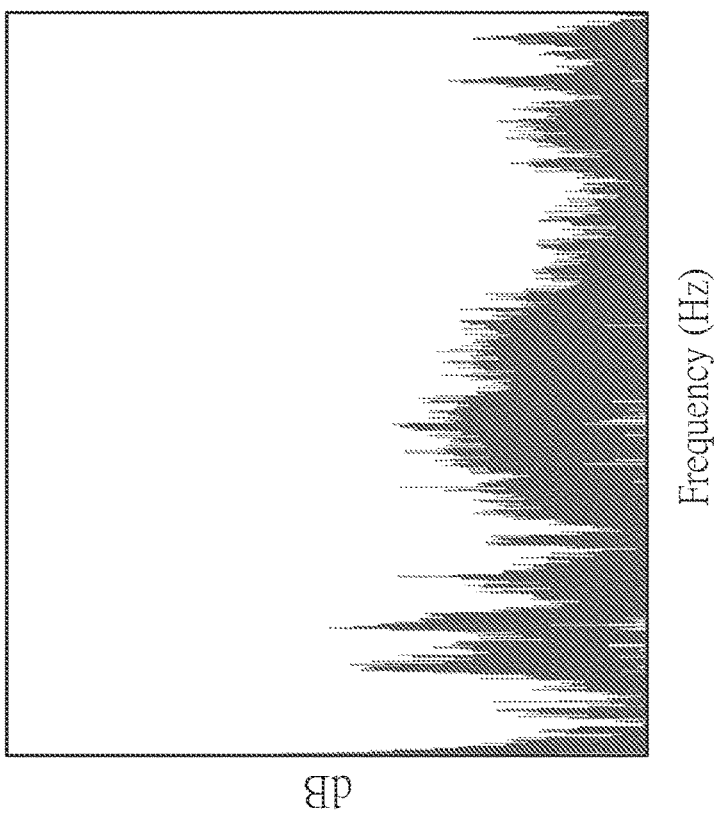
FIG. 11A is a signal diagram in the verification procedure to show the detection result of detecting the vibration of the slide rail in the initial state along the X axis by the upper sensor.
Figure 12B:
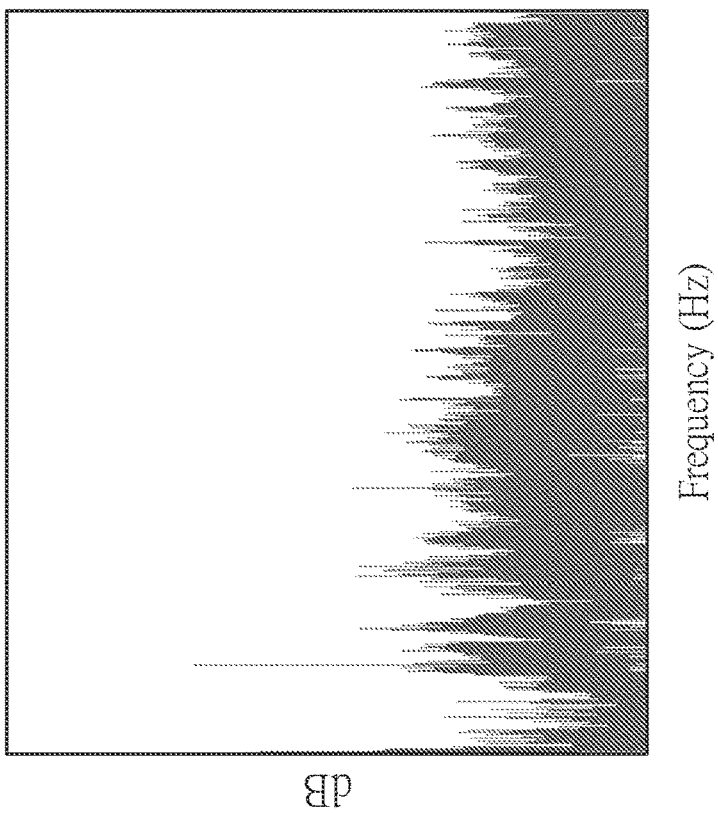
FIG. 12B is a signal diagram in the verification procedure to show the detection result of detecting the vibration of the slide rail in the abnormal state along the X axis by the right sensor.
Figure 12A:
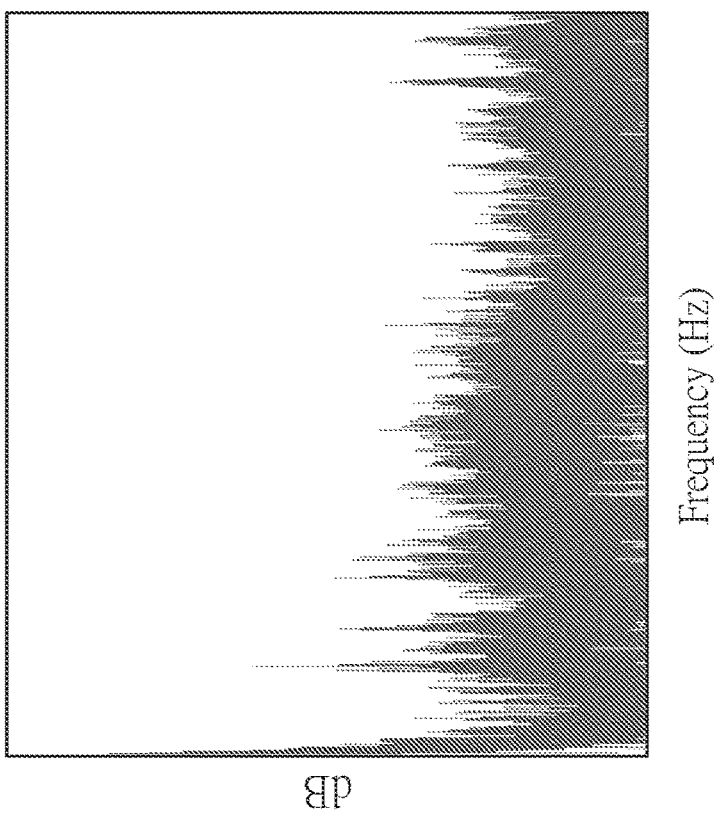
FIG. 12A is a signal diagram in the verification procedure to show the detection result of detecting the vibration of the slide rail in the initial state along the X axis by the right sensor.
Figure 13B:
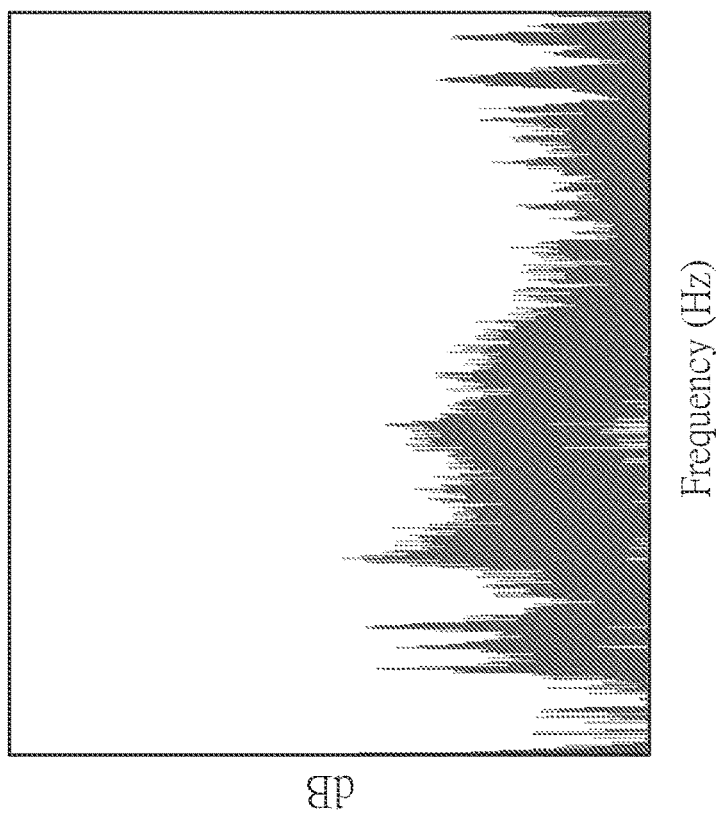
FIG. 13B is a signal diagram in the verification procedure to show the detection result of detecting the vibration of the slide rail in an abnormal state along the Y axis by the left sensor.
Figure 13A:
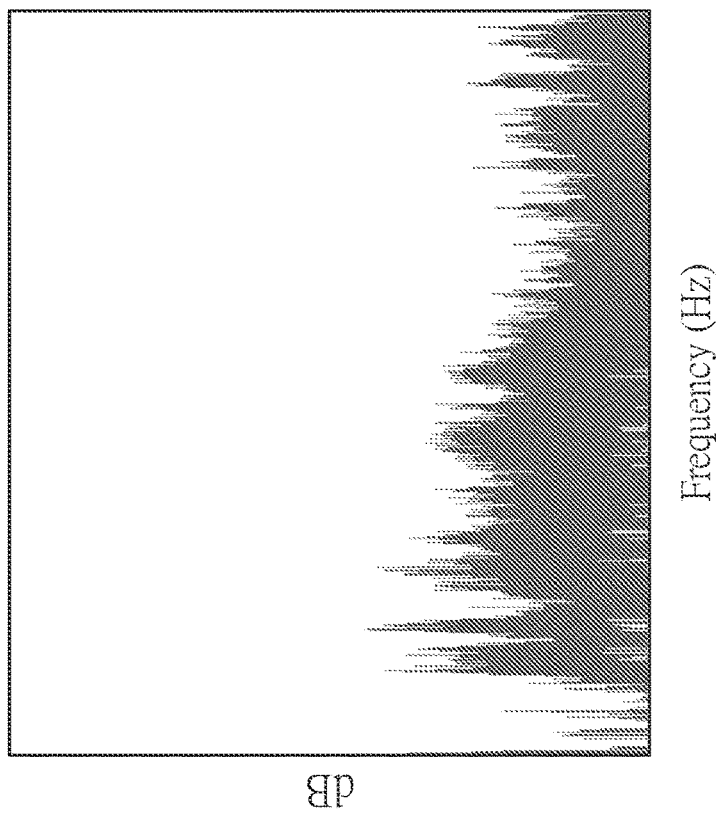
FIG. 13A is a signal diagram in the verification procedure to show the detection result of detecting the vibration of the slide rail in the initial state along the Y axis by the left sensor.
Figure 14B:
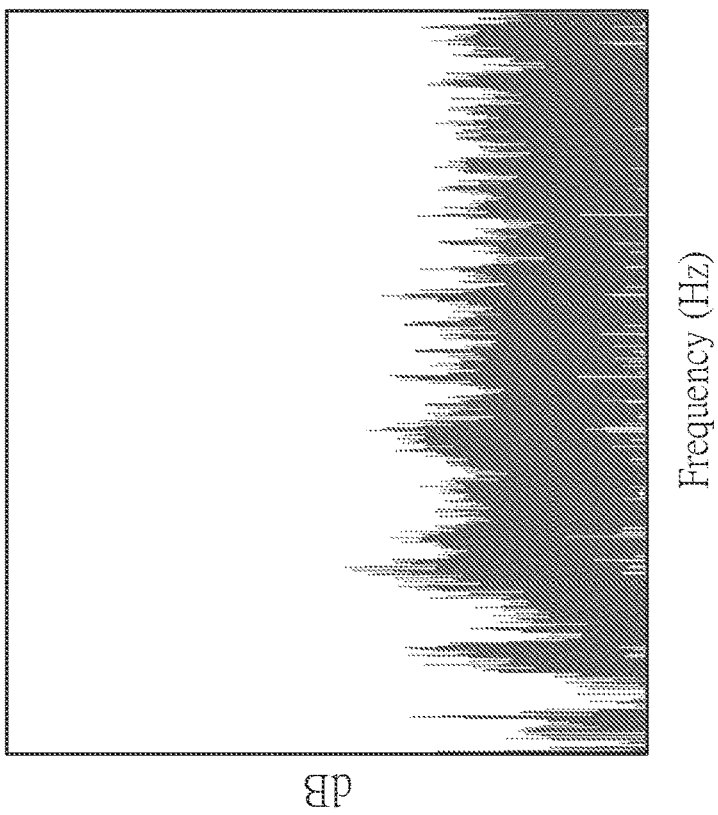
FIG. 14B is a signal diagram in the verification procedure to show the detection result of detecting the vibration of the slide rail in an abnormal state along the Y axis by the upper sensor.
Figure 14A:
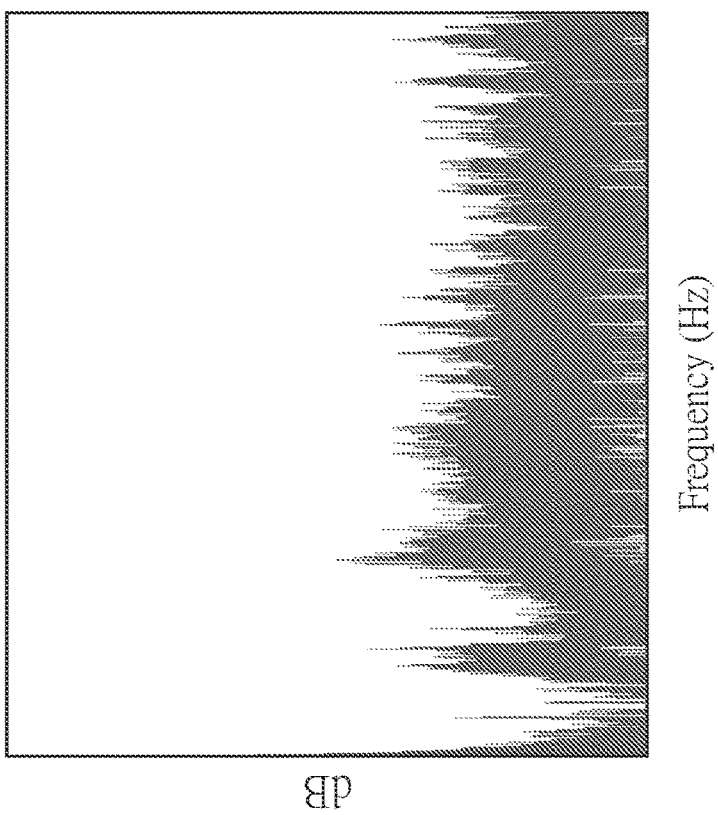
FIG. 14A is a signal diagram in the verification procedure to show the detection result of detecting the vibration of the slide rail in the initial state along the Y axis by the upper sensor.
Figure 15A:
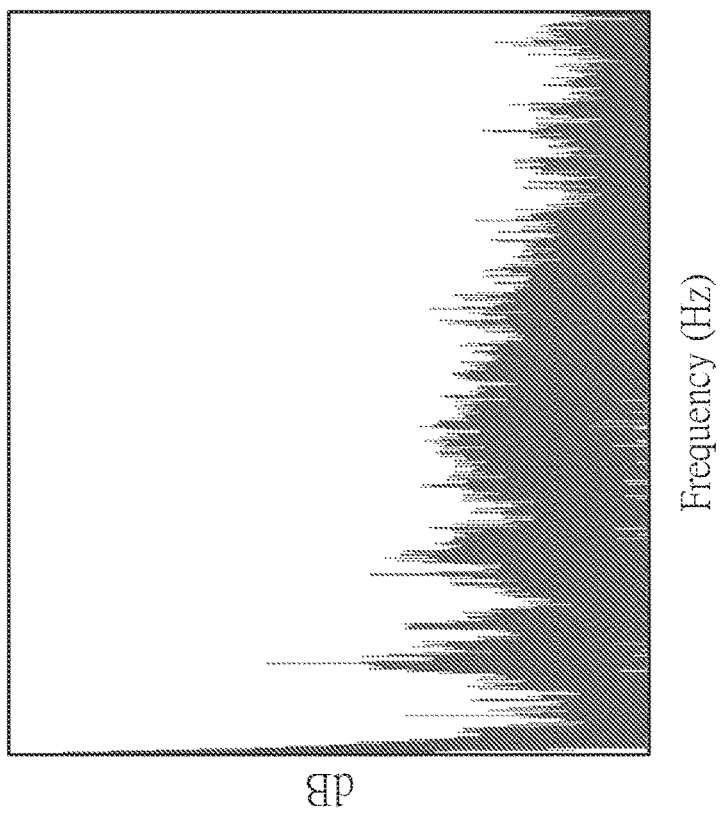
FIG. 15A is a signal diagram in the verification procedure to show the detection result of detecting the vibration of the slide rail in the initial state along the Y axis by the right sensor.
Figure 15B:
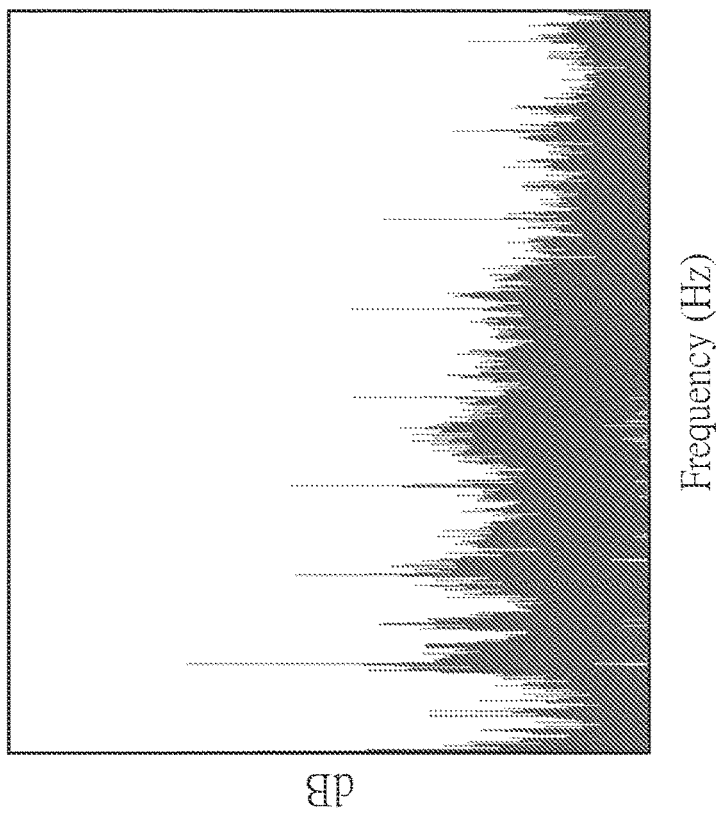
FIG. 15B is a signal diagram in the verification procedure to show the detection result of detecting the vibration of the slide rail in an abnormal state along the Y axis by the right sensor.

Please also refer to FIG. 5 to illustrate a method of detecting the states of the linear guideway 30 by this device. First, the two sensors 11 located on the two opposite sides of the slide rail 22 detect the vibration of the slide rail 22 to generate two sensing signals (i.e., a first sensing signal and a second sensing signal) respectively, as shown in step S501, and further transmit the two sensing signals to the analysis processor 12. The analysis processor 12 includes a signal processing circuit 121, a feature analysis unit 122, a threshold supply unit 123, and a state analysis unit 124. The state analysis unit 124 is electrically connected to the signal processing circuit 121, the feature analysis unit 122, the threshold supply unit 123, and the state analysis unit 124, as shown in FIG. 1.

Figure 16:
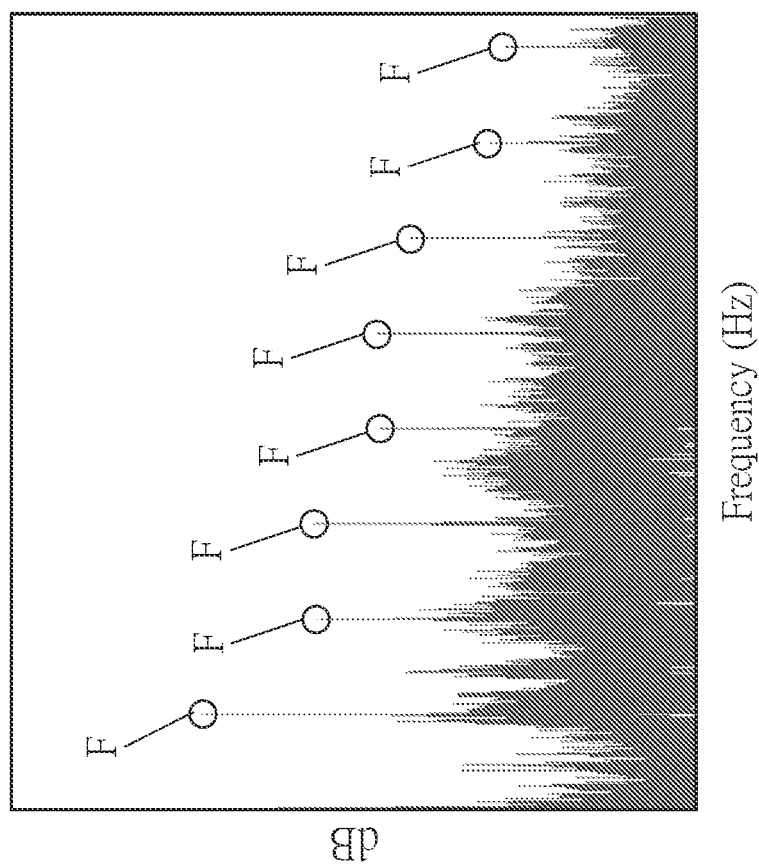
FIG. 16 is a waveform diagram of a sensing signal in the frequency domain according to an embodiment of the present invention.

At this time, through the conversion circuit of the signal processing circuit 121 of the analysis processor 12, the two sensing signals are converted from time domain signals to frequency domain signals, for example, through a fast Fourier transform. Then, the filter circuit of the signal processing circuit 121 may perform a first stage filtering on the two sensing signals, and for example, a low-pass filter is used to filter out high-frequency components with frequencies higher than the cut-off frequency from the two sensing signals, as shown in step S502. Then, the analysis processor 12 performs a feature frequency analysis on the first sensing signal and the second sensing signal issued from the first-stage filtering, through the feature analysis unit 122 to obtain feature frequencies of the first sensing signal and the second sensing signal, as shown in step S503. Specifically, the feature analysis unit 122 includes, for example, a sampling circuit, so the sampling circuit can sample the two signals to obtain at least one signal sample as a feature frequency, such as feature frequencies F in FIG. 16.

Next, the state analysis unit 124 obtains a first threshold TH1 from the threshold supply unit 123, and compares the first threshold TH1 with a difference between a level (referred to as peak value) Z1 of the first sensing signal corresponding to a feature frequency of the first sensing signal, and a level (referred to as peak value) Z2 of the second sensing signal corresponding to a feature frequency of the second sensing signal, and determines whether the absolute value of the difference (level difference) between the levels Z1 and Z2 is greater than or equal to the first threshold TH1, as shown in step S504. For example, the level Z1 corresponding to the first one of the feature frequencies of the first sensing signal is compared with the level Z2 corresponding to the first one of the feature frequencies of the second sensing signal. The level corresponding to the feature frequency is an energy value in dB. In this embodiment, the first threshold TH1 can be set by the user to be greater than or equal to 3 dB. In other embodiments, the first threshold TH1 is, for example, the difference between the absolute value of the aforementioned difference between the levels Z1 and Z2 and the level Z1 or Z2. Specifically, when the level Z1 is greater than the level Z2, the first threshold TH1 is the ratio between the absolute value of the above difference between the levels Z1 and Z2 and the level Z2 (TH1=|Z1−Z2|/Z2); when the level Z1 is smaller than the level Z2, the first threshold TH1 is the ratio between the absolute value of the above difference between the levels Z1 and Z2 and the level Z1(TH1=|Z1−Z2|/Z1); and when the level Z1 is equal to the level Z2, the first threshold TH1 is the ratio between the absolute value of the above difference between the levels Z1 and Z2 and any of the levels Z1 and Z2(TH1=|Z1−Z2|/Z1 or TH1=|Z1−Z2|/Z2).

When the absolute value of the difference between the levels Z1 and Z2 is greater than or equal to the first threshold TH1 in step S504, the state analysis unit 124 determines that an abnormality occurs at one side of the linear guideway 20, based on the comparison result, as shown in step S505.

When the absolute value of the above difference between the levels Z1 and Z2 is less than the first threshold TH1 in step S504, the state analysis unit 124 obtains a second threshold TH2 from the threshold supply unit 123, and respectively compares a feature number P1 (referred to as first feature number) of the first sensing signal, namely the number of feature frequencies in the first sensing signal, and a feature number P2 (referred to as second feature number) of the second sensing signal, namely the number of feature frequencies in the second sensing signal, with the second threshold TH2 to determine whether the feature number P1 and the feature number P2 are both greater than or equal to the second threshold TH2, as shown in step S506. The second threshold H2 is, for example, greater than or equal to 2 dB, which can be set by the user. For example, the sampling result shown in FIG. 16 has 8 feature frequencies F.

When the feature number P1 and the feature number P2 are both greater than or equal to the second threshold TH2 in step S506, the state analysis unit 124 obtains a third threshold TH3 (or referred to as gain threshold) from the threshold supply unit 123, and determines whether a level (referred to as peak value) Q1 of the first sensing signal corresponding to a feature frequency of the first sensing signal, or a level (referred to as peak value) Q2 of the second sensing signal corresponding to a feature frequency of the second sensing signal is greater than or equal to the third threshold TH3, as shown in step S507. In this embodiment, the third threshold TH3 can be set by the user, for example, set to a value greater than an initial value by 3 dB.

When the level Q1 or the level Q2 is greater than or equal to the third threshold TH3 in step S507, the state analysis unit 124 determines that an abnormality occurs on both sides of the linear guideway 20, according to the comparison result, as shown in step S508. Conversely, when the level Q1 or the level Q2 is less than the third threshold TH3, the state analysis unit 124 determines that the linear guideway 20 now operates normally, according to the comparison result, as shown in step S511.

When the feature number P1 or the feature number P2 is less than the second threshold TH2 in step S506, the filter circuit of the signal processing circuit 121 performs a second stage filtering on the first sensing signal and the second sensing signal; and for example, a band-stop filter is used to filter out the component with a frequency of 60 Hz, as shown in step S509. Then, the state analysis unit 124 obtains the second threshold TH2 from the threshold supply unit 123, and determines whether a feature number P3 (referred to as third feature number, that is, the number of feature frequencies) of the first sensing signal issued from the second stage filtering, and a feature number P4 (referred to as fourth feature number, that is, the number of feature frequencies) of the second sensing signal issued from the second stage filtering, are greater than or equal to the second threshold TH2, as shown in step S510.

When the feature number P3 and the feature number P4 are both greater than or equal to the second threshold TH2 in step S510, the analysis processor 12 executes the step S507 to respectively determine whether the level (i.e., the peak value of the feature frequency) Q1 of the first sensing signal and the level (i.e., the peak value of the feature frequency) Q2 of the second sensing signal are greater than or equal to the third threshold TH3.

When the feature number P3 or the feature number P4 is less than the second threshold TH2 in step S510, the state analysis unit 124 determines that the linear guideway 20 now operates normally, according to the comparison result, as shown in step S511.

Finally, the determination result of the state analysis unit 124 is transmitted to the display 13 for presentation to the on-site operator for reference. In this way, the on-site operator can quickly and instantly stop the abnormal linear guideway 20 from operating.

Please refer to FIGS. 6 to 9B, which show an exemplary experiment for verifying the influence of the installation positions of the sensors 11 on the detection result. In this exemplary experiment, firstly, three identical sensors 11, are attached to the two side surfaces 221 and the upper surface 222 of the slide rail 22 at the end 223 respectively, that is, the sensor 11 on the left, the sensor 11 on the right, and the sensor 11 on the top in the figure. Then, the sliding block slides on the slide rail 22, and at the same time, the three sensors 11 detect the vibration of the slide rail 22 in the X-axis direction, the Y-axis direction, and the Z-axis direction. The detection results of the vibration in the Z-axis direction as shown in FIGS. 7A to 9B show that, as compared with the signal issued from the top sensor 11, there are larger differences in issued signal between the left and right sensors 11 in the initial state of the linear guideway 20 and those in the abnormal state of the linear guideway 20, so the occurrence of abnormalities can be detected more sensitively. The initial state is the state of a new and normal linear guideway at the beginning of its operation. The results of the vibration detection in the X-axis direction shown in FIGS. 10A to 12B show that, as compared to the signal issued from the top sensor 11, there are larger differences in issued signal between the left and right sensors 11 in the initial state of the linear guideway 20 and those in the abnormal state of the linear guideway 20, so the occurrence of abnormalities can be detected more sensitively. The results of the vibration detection in the Y-axis direction shown in FIGS. 13A to 15B show that, as compared to the signal issued from the top sensor 11, there are larger differences in issued signal between the left and right sensors 11 in the initial state of the linear guideway 20 and those in the abnormal state of the linear guideway 20, so the occurrence of abnormalities can be detected more sensitively. Therefore, it is obvious from the aforementioned verification procedure that the sensors 11 arranged on the left and right sides of the slide rail 22 can more sensitively detect the occurrence of abnormalities.

Although the foregoing embodiments are described based on an example in which two sensors 11 are respectively provided on the opposite side surfaces 221 of one end of the slide rail 22, the present invention is not limited to this example. In another embodiment, only one sensor 11 may be provided on one of the side surfaces 221 of the slide rail 22 to detect the state of the linear guideway 20.

Figure 2:
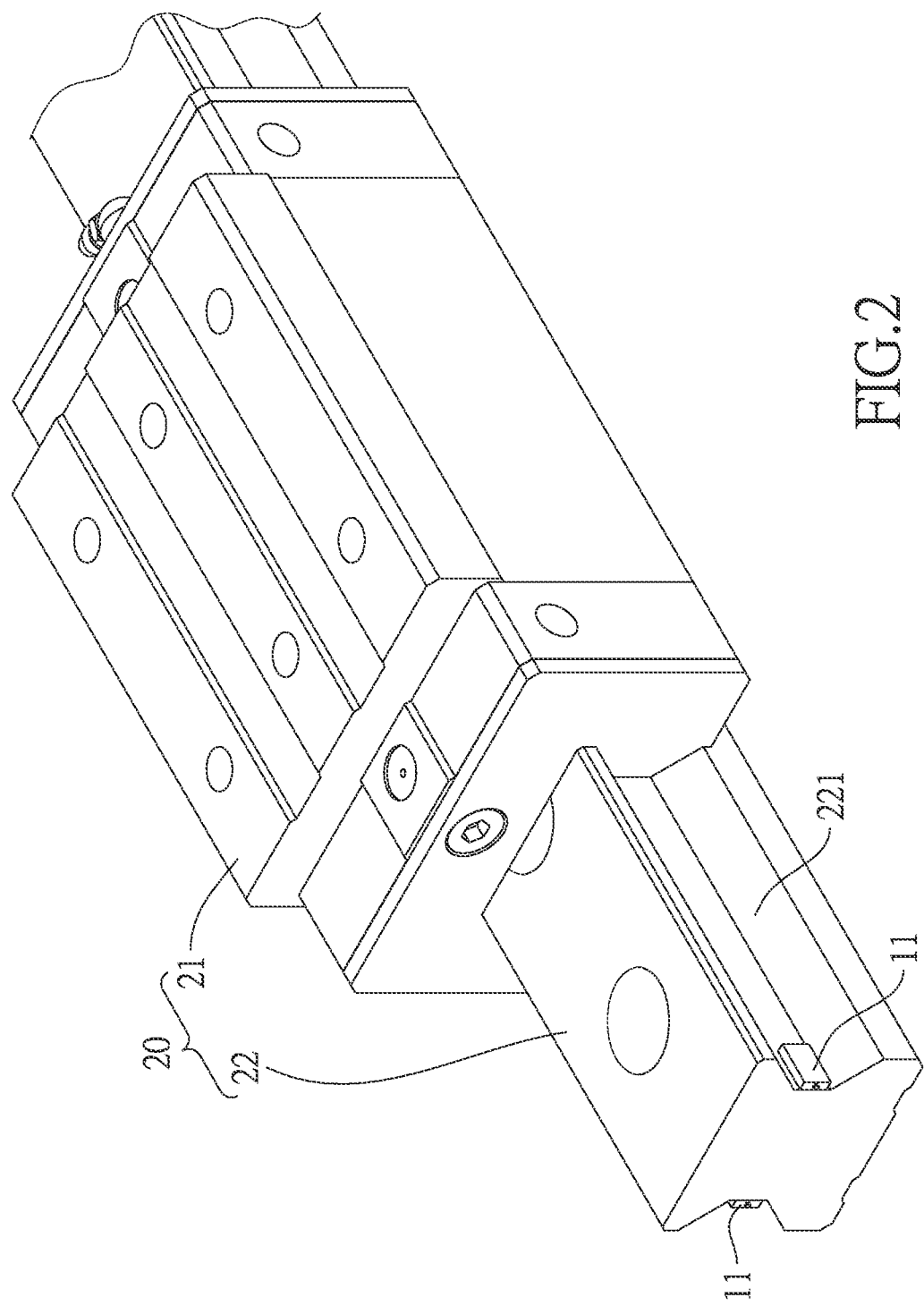
FIG. 2 is a schematic diagram of installing two sensors on a linear guideway according to an embodiment of the present invention.
Figure 21:
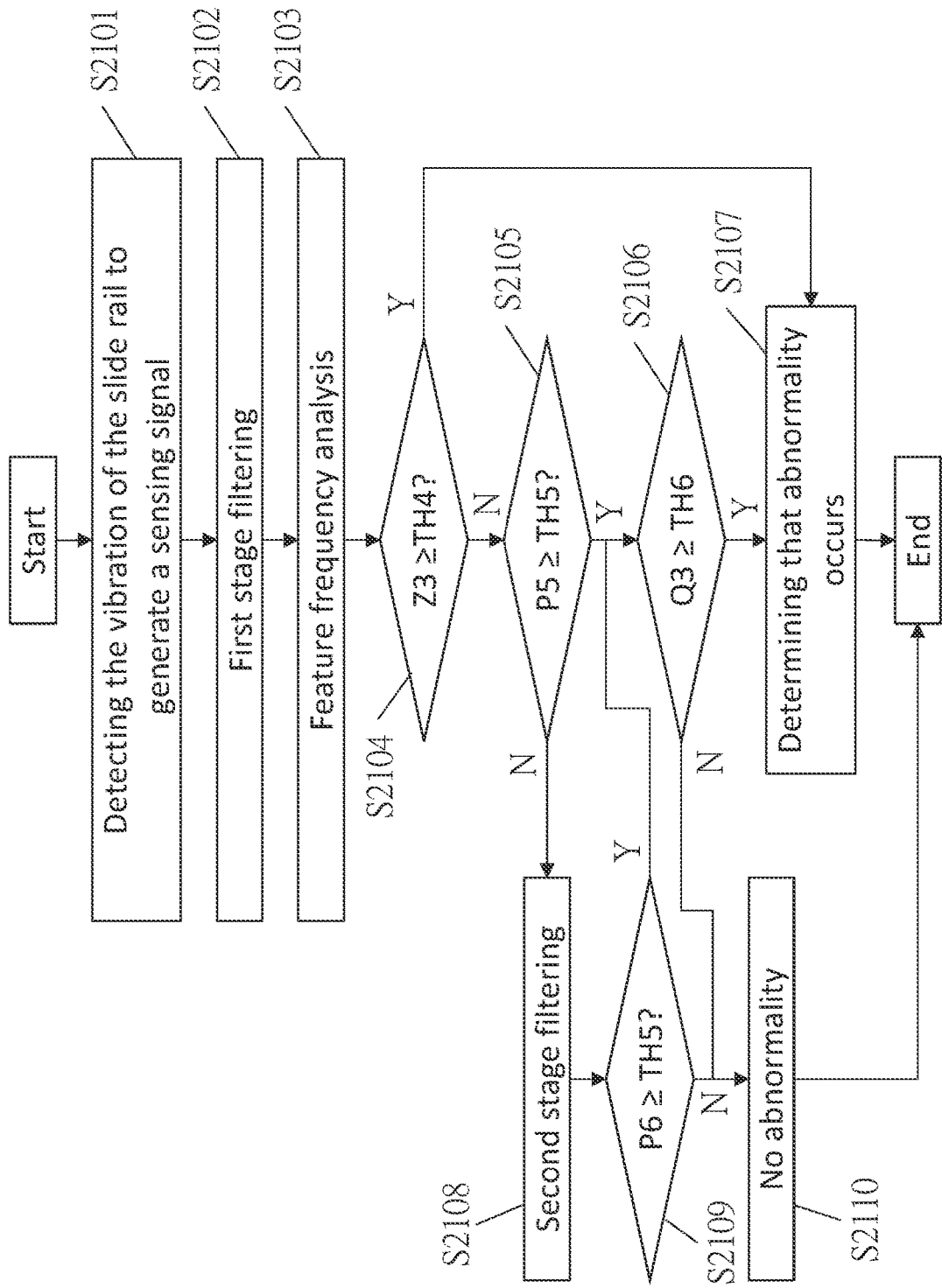
FIG. 21 is a flowchart of a method for detecting states of a linear guideway according to an embodiment of the present invention.

Please refer to FIG. 21, which shows the method for detecting the state of the linear guideway 20 of FIG. 2 by this device. First, a step S2101 is executed, that is, the vibration of the slide rail 22 is detected through the single sensor 11 to generate a sensing signal. After receiving the sensing signal, the analysis processor 12 in FIG. 1 converts the signal from a time domain signal to a frequency domain signal. Next, steps S2102 and S2103 are executed, and the steps S2102 and S2103 are similar to the steps S502 and S503 in FIG. 5, respectively. Therefore, for the description of the steps S2102 and S2103, please refer to the related description of the steps S502 and S503 in FIG. 5, and it will not be repeated here.

Then, a step S2104 is executed; and that is, the state analysis unit 124 obtains the first threshold TH4 from the threshold supply unit 123, and determines whether a level (referred to as peak value) Z3 of the sensing signal corresponding to a feature frequency of the sensing signal is greater than or equal to the first threshold TH4. For example, take the level Z3 corresponding to the first one of the feature frequencies of the sensing signal to determine. In this embodiment, the first threshold TH4 can be set by the user to be greater than or equal to 3 dB, for example.

When the level Z3 is greater than or equal to the first threshold TH4 in step S2104, the state analysis unit 124 determines that the linear guideway 20 is abnormal, as shown in step S2107. Conversely, when the level Z3 is less than the first threshold TH4 in step S2104, the state analysis unit 124 obtains a second threshold TH5 from the threshold supply unit 123, and determines whether a feature number P5 (referred to as first feature frequency, that is, the number of feature frequencies) of the sensing signal is greater than or equal to the second threshold TH5, as shown in a step S2105. The second threshold TH5 can be set by the user to be greater than or equal to 2 dB, for example.

When the feature number P1 is greater than or equal to the second threshold TH5 in step S2105, the state analysis unit 124 obtains the third threshold TH6 (or referred to as gain threshold) from the threshold supply unit 123, and determines whether a level (referred to as peak value) Q3 of the sensing signal corresponding to a feature frequency of the sensing signal is greater than or equal to the third threshold TH6, as shown in a step S2106. In this embodiment, the third threshold TH6 can be set by the user to a value greater than the initial value by 3 dB, for example.

When the level Q3 is greater than or equal to the third threshold TH6 in step S2106, the state analysis unit 124 determines that the linear guideway 20 is abnormal, as shown in the step S2107. Conversely, when the level Q3 is less than the third threshold TH6 in step S2106, the state analysis unit 124 determines that the linear guideway 20 now operates normally, as shown in a step S2110.

When the feature number P5 is less than the second threshold TH5 in step S2105, a step S2108 is executed, that is, the second stage filtering is performed. The step S2108 is similar to the step S509 of FIG. 5, so the description of step S2108 can refer to the related description of step S509, and will not be repeated here. Next, the state analysis unit 124 determines whether a feature number P6 (referred to as second feature number, that is, the number of feature frequencies) of the sensing signal issued from the second stage filtering is greater than or equal to the second threshold TH5, as shown in a step S2109.

When the feature number P6 is greater than or equal to the second threshold TH5 in step S2109, the analysis processor 12 executes the step S2106. Conversely, when the feature number P6 is less than the second threshold TH5 in step S2109, the state analysis unit 124 determines that the linear guideway 20 now operates normally, as shown in the step S2110.

Finally, the determination results of the state analysis unit 124 will be transmitted to the display 13 for presentation to the on-site operator for reference. In this way, the on-site operator can quickly and instantly stop the abnormal linear guideway 20 from operating.

In summary, the embodiments of the present invention provide a device and method for detecting the state of a linear guideway. By installing at least one sensor to the side(s) of one end of the slide rail, it is not only convenient for disassembly and assembly, but also the detection sensitivity of the device may be enhanced. In addition, this device also analyzes the sensing signals of the two sensors through multiple thresholds, so as to determine the possible positions of abnormalities occurring on the linear guideway, and the influence of noise on the detection results may reduce. Furthermore, if the sensor is installed on a side of the end of the slide rail and is close to the surface of the slide rail far away from the sliding block, it is possible for the sliding block to slide on the entire slide rail without affecting the slidable stroke of the slide rail.

While we have shown and described various embodiments in accordance with the present invention, it is clear to those skilled in the art that further embodiments may be made without departing from the scope of the present invention.

What is claimed is:

1. A method for detecting states of a linear guideway, the linear guideway including a sliding block and a slide rail, the sliding block including an accommodating groove for accommodating the slide rail, the sliding block further including two opposite side surfaces in the accommodating groove, the slide rail including two opposite side surfaces respectively corresponding to the two side surfaces of the sliding block, and the method comprising the following steps:
   (A) detecting, by at least one sensor, vibration of the slide rail to generate a sensing signal, wherein the at least one sensor is located at one end of the slide rail and respectively located on or adjacent to at least one of the two side surfaces of the slide rail; and
   (B) determining, by an analysis processor, occurrence of an abnormality according to a level of the sensing signal and at least one threshold, wherein:
   the number of the at least one sensor is two, the two sensors are respectively located on or adjacent to the two side surfaces of the slide rail, the sensing signals generated by the two sensors detecting the vibration of the slide rail are defined as a first sensing signal and a second sensing signal, and the step (B) comprises the following steps:
   (B1) determining whether a difference between a level of the first sensing signal and a level of the second sensing signal is greater than or equal to a first threshold;
   (B2) the difference between the level of the first sensing signal and the level of the second sensing signal is less than the first threshold, further comparing a first feature number of the first sensing signal with a second threshold and comparing a second feature number of the second sensing signal with the second threshold by the analysis processor;
   (B3) comparing the first feature number and the second feature number to determine they are both greater than or equal to the second threshold, comparing the level of the first sensing signal with a third threshold and comparing the level of the second sensing signal with the third threshold by the analysis processor;
   (B4) the level of the first sensing signal and level of the second sensing signal are greater than or equal to the third threshold, determining, by the analysis processor, that an abnormality occurs at each of the two opposite sides of the linear guideway; and
   the first feature number is the number of feature frequencies in the first sensing signal, and the second feature number is the number of feature frequencies in the second sensing signal.

2. A method for detecting states of a linear guideway, the linear guideway including a sliding block and a slide rail, the sliding block including an accommodating groove for accommodating the slide rail, the sliding block further including two opposite side surfaces in the accommodating groove, the slide rail including two opposite side surfaces respectively corresponding to the two side surfaces of the sliding block, and the method comprising the following steps:
   (A) detecting, by at least one sensor, vibration of the slide rail to generate a sensing signal, wherein the at least one sensor is located at one end of the slide rail and respectively located on or adjacent to at least one of the two side surfaces of the slide rail; and
   (B) determining, by an analysis processor, occurrence of an abnormality according to a level of the sensing signal and at least one threshold, wherein:
   the number of the at least one sensor is two, the two sensors are respectively located on or adjacent to the two side surfaces of the slide rail, the sensing signals generated by the two sensors detecting the vibration of the slide rail are defined as a first sensing signal and a second sensing signal, and the step (B) comprises the following steps:
   (B1) determining whether a difference between a level of the first sensing signal and a level of the second sensing signal is greater than or equal to a first threshold;
   (B2) the difference between the level of the first sensing signal and the level of the second sensing signal is less than the first threshold, comparing a first feature number of the first sensing signal with a second threshold and comparing a second feature number of the second sensing signal with the second threshold by the analysis processor;
   (B5) the first feature number or the second feature number is less than the second threshold, filtering the first sensing signal and the second sensing signal to generate a third sensing signal and a fourth sensing signal;

(B6) comparing a third feature number of the third sensing signal with the second threshold, and comparing a fourth feature number of the fourth sensing signal with the second threshold by the analysis processor; and (B7) the third feature number and the fourth feature number are both greater than or equal to the second threshold, comparing the level of the first sensing signal with a third threshold and comparing the level of the second sensing signal with the third threshold by the analysis processor;

(B4) the level of the first sensing signal and level of the second sensing signal are greater than or equal to the third threshold, determining, by the analysis processor, that an abnormality occurs at each of the two opposite sides of the linear guideway, wherein the third feature number is the number of feature frequencies in the third sensing signal, and the fourth feature number is the number of feature frequencies in the fourth sensing signal.

3. A method for detecting states of a linear guideway, the linear guideway including a sliding block and a slide rail, the sliding block including an accommodating groove for accommodating the slide rail, the sliding block further including two opposite side surfaces in the accommodating groove, the slide rail including two opposite side surfaces respectively corresponding to the two side surfaces of the sliding block, and the method comprising the following steps:

(A) detecting, by at least one sensor, vibration of the slide rail to generate a sensing signal, wherein the at least one sensor is located at one end of the slide rail and respectively located on or adjacent to at least one of the two side surfaces of the slide rail; and (B) determining, by an analysis processor, occurrence of an abnormality according to a level of the sensing signal and at least one threshold, wherein:

the number of the at least one sensor is two, the two sensors are respectively located on or adjacent to the two side surfaces of the slide rail, the sensing signals generated by the two sensors detecting the vibration of the slide rail are defined as a first sensing signal and a second sensing signal, and the step (B) comprises the following steps:

(B1) determining whether a difference between a level of the first sensing signal and a level of the second sensing signal is greater than or equal to a first threshold;

(B2) the difference between the level of the first sensing signal and the level of the second sensing signal is less than the first threshold, comparing a first feature number of the first sensing signal with a second threshold and comparing a second feature number of the second sensing signal with the second threshold by the analysis processor;

(B5) the first feature number or the second feature number is less than the second threshold, filtering the first sensing signal and the second sensing signal to generate a third sensing signal and a fourth sensing signal;

(B6) comparing a third feature number of the third sensing signal with the second threshold, and comparing a fourth feature number of the fourth sensing signal with the second threshold by the analysis processor; and (B7) the third feature number or the fourth feature number is less than the second threshold, determining, by the analysis processor, that the linear guideway is normal, wherein the third feature number is the number of feature frequencies in the third sensing signal, and the fourth feature number is the number of feature frequencies in the fourth sensing signal.

* * * * *